(12) United States Patent
Wilcoxen et al.

(10) Patent No.: US 9,731,475 B2
(45) Date of Patent: Aug. 15, 2017

(54) FILMS AND BAGS WITH VISUALLY DISTINCT REGIONS AND METHODS OF MAKING THE SAME

(71) Applicant: The Glad Products Company, Oakland, CA (US)

(72) Inventors: Kyle R. Wilcoxen, Des Plaines, IL (US); Theodore J. Fish, Willowbrook, IL (US); Jason R. Maxwell, Willowbrook, IL (US); Kenneth E. Cisek, Willowbrook, IL (US); Michael O. Johnson, Cincinnati, OH (US)

(73) Assignee: The Glad Products Company, Oakland, CA (US)

( * ) Notice: Subject to any disclaimer, the term of this patent is extended or adjusted under 35 U.S.C. 154(b) by 0 days.

(21) Appl. No.: 14/485,463

(22) Filed: Sep. 12, 2014

(65) Prior Publication Data

US 2015/0003757 A1 Jan. 1, 2015

Related U.S. Application Data

(63) Continuation-in-part of application No. 13/660,844, filed on Oct. 25, 2012, now Pat. No. 8,865,294, and
(Continued)

(51) Int. Cl.
*B32B 3/30* (2006.01)
*B32B 7/04* (2006.01)
(Continued)

(52) U.S. Cl.
CPC ............... *B32B 3/30* (2013.01); *B32B 7/045* (2013.01); *B32B 27/08* (2013.01); *B32B 27/20* (2013.01);
(Continued)

(58) Field of Classification Search
CPC ..... B32B 33/30; B32B 38/0012; B32B 27/20; B32B 27/08; B32B 7/045; B32B 37/0076;
(Continued)

(56) References Cited

U.S. PATENT DOCUMENTS

| | | |
|---|---|---|
| 2,714,571 A | 8/1955 | Irion et al. |
| 3,058,868 A | 10/1962 | Schroeder |

(Continued)

FOREIGN PATENT DOCUMENTS

| | | |
|---|---|---|
| KR | 10-1032232 | 5/2011 |
| WO | 9013702 | 11/1990 |

(Continued)

OTHER PUBLICATIONS

International Search Report, mailed Jan. 21, 2011, from counterpart PCT/US10/56799, filed Nov. 16, 2010.
(Continued)

*Primary Examiner* — Laura Powers
(74) *Attorney, Agent, or Firm* — Thomas C. Feix

(57) ABSTRACT

One or more implementations of a multi-layer film include a first substantially un-pigmented layer non-continuously bonded to a second pigmented layer. The multi-layer film includes an unexpected appearance differing from the appearance of the pigmented layer. In one or more embodiments, the multi-layer film includes a metallic appearance despite the pigmented layer being devoid of metallic pigment. The multi-layer film also includes areas that are visually distinct from areas of the film with the unexpected appearance. The visually-distinct areas comprise areas in which the first substantially un-pigmented layer non-continuously bonded is in intimate contact with the second pigmented layer. The visually-distinct areas have the appearance of the pigmented layer. One or more implementations
(Continued)

also include methods of making multi-layer films and bags with an unexpected appearance and visually-distinct areas.

21 Claims, 23 Drawing Sheets

Related U.S. Application Data a continuation-in-part of application No. 13/299,177, filed on Nov. 17, 2011, now Pat. No. 9,186,862, which is a continuation-in-part of application No. 12/947,025, filed on Nov. 16, 2010, now Pat. No. 8,603,609, application No. 14/485,463, which is a continuation-in-part of application No. 13/838,394, filed on Mar. 15, 2012, now Pat. No. 9,393,757, which is a continuation-in-part of application No. 13/454,412, filed on Apr. 24, 2012, now Pat. No. 9,381,697, said application No. 13/838,394 is a continuation-in-part of application No. 13/454,474, filed on Apr. 24, 2012, now Pat. No. 9,381,718, said application No. 13/838,394 is a continuation-in-part of application No. 13/552,352, filed on Jul. 18, 2012, now Pat. No. 9,486,977.

(60) Provisional application No. 61/261,673, filed on Nov. 16, 2009, provisional application No. 61/478,639, filed on Apr. 25, 2011, provisional application No. 61/478,643, filed on Apr. 25, 2011.

(51) Int. Cl.
*B32B 27/08* (2006.01)
*B32B 27/20* (2006.01)
*B32B 27/32* (2006.01)
*B32B 37/00* (2006.01)
*B32B 38/00* (2006.01)
*B65D 33/00* (2006.01)
*B65D 65/40* (2006.01)

(52) U.S. Cl.
CPC .......... *B32B 27/32* (2013.01); *B32B 37/0076* (2013.01); *B32B 38/0012* (2013.01); *B65D 33/004* (2013.01); *B65D 65/403* (2013.01); *B32B 2038/0028* (2013.01); *B32B 2250/02* (2013.01); *B32B 2307/402* (2013.01); *B32B 2307/4026* (2013.01); *B32B 2439/06* (2013.01); *B32B 2553/00* (2013.01); *Y10T 428/2457* (2015.01); *Y10T 428/24802* (2015.01); *Y10T 428/24826* (2015.01); *Y10T 428/24909* (2015.01)

(58) Field of Classification Search
CPC ............ B32B 27/32; B32B 2307/4026; B32B 2439/06; B32B 2038/0028; B32B 2553/00; B32B 2307/402; B32B 2250/02; B65D 65/403; B65D 33/004; Y10T 428/2457; Y10T 428/24826; Y10T 428/24802; Y10T 428/24909
See application file for complete search history.

(56) References Cited

U.S. PATENT DOCUMENTS

| | | | |
|---|---|---|---|
| 3,322,613 A | 5/1967 | Rasmussen | |
| 3,622,422 A | 11/1971 | Newman et al. | |
| 3,857,144 A | 12/1974 | Bustin | |
| 4,116,892 A | 9/1978 | Schwarz | |
| 4,153,751 A | 5/1979 | Schwarz | |
| 4,289,832 A | 9/1981 | Schwarz | |
| 4,302,495 A | 11/1981 | Marra | |
| 4,343,848 A | 8/1982 | Leonard, Jr. | |
| 4,379,197 A | 4/1983 | Cipriani | |
| 4,410,582 A | 10/1983 | Tsunashima et al. | |
| 4,438,167 A | 3/1984 | Schwarz | |
| 4,517,714 A | 5/1985 | Sneed et al. | |
| 4,522,203 A | 6/1985 | Mays | |
| 4,614,679 A | 9/1986 | Farrington et al. | |
| 4,692,368 A | 9/1987 | Taylor et al. | |
| 4,704,238 A | 11/1987 | Okuyama et al. | |
| 4,753,840 A | 6/1988 | Van Gompel | |
| 4,793,885 A | 12/1988 | Rasmussen | |
| 4,814,135 A | 3/1989 | Heitz | |
| 4,857,600 A | 8/1989 | Gross et al. | |
| 4,930,905 A | 6/1990 | Sharps, Jr. | |
| 5,035,941 A | 7/1991 | Blackburn | |
| 5,076,988 A | 12/1991 | Rifi | |
| 5,100,721 A | 3/1992 | Akao | |
| 5,153,382 A | 10/1992 | Gross et al. | |
| 5,167,897 A | 12/1992 | Weber et al. | |
| 5,296,184 A | 3/1994 | Wu et al. | |
| 5,382,461 A | 1/1995 | Wu | |
| 5,422,172 A | 6/1995 | Wu | |
| 5,518,801 A | 5/1996 | Chappell et al. | |
| 5,851,937 A | 12/1998 | Wu et al. | |
| 5,861,074 A | 1/1999 | Wu | |
| 5,865,824 A | 2/1999 | Chen et al. | |
| 5,865,926 A | 2/1999 | Wu et al. | |
| 5,882,769 A | 3/1999 | McCormack | |
| 6,013,151 A | 1/2000 | Wu et al. | |
| 6,139,185 A | 10/2000 | Hamilton et al. | |
| 6,150,647 A | 11/2000 | Anderson et al. | |
| 6,214,147 B1 | 4/2001 | Mortellite et al. | |
| 6,254,736 B1 | 7/2001 | Earl et al. | |
| 6,265,045 B1 | 7/2001 | Mushaben | |
| 6,284,344 B1 | 9/2001 | Barnes et al. | |
| 6,361,784 B1 | 3/2002 | Brennan et al. | |
| 6,385,818 B1 | 5/2002 | Savicki, Sr. | |
| 6,394,651 B2 | 5/2002 | Jackson | |
| 6,394,652 B2 | 5/2002 | Meyer et al. | |
| 6,513,975 B1 | 2/2003 | Jackson et al. | |
| 6,695,476 B2 | 2/2004 | Jackson et al. | |
| 6,719,742 B1 * | 4/2004 | McCormack | A61F 13/51462 604/367 |
| 7,132,151 B2 | 11/2006 | Rasmussen | |
| 7,306,729 B2 | 12/2007 | Bacino et al. | |
| 7,901,758 B2 | 3/2011 | Rasmussen | |
| 8,124,243 B2 * | 2/2012 | Wright | C08J 5/18 428/323 |
| 8,263,210 B2 | 9/2012 | Rasmussen | |
| 8,309,206 B2 | 11/2012 | Rasmussen | |
| 8,557,364 B2 * | 10/2013 | Rasmussen | B29C 55/18 428/105 |
| 2002/0074691 A1 | 6/2002 | Mortellite et al. | |
| 2003/0024625 A1 | 2/2003 | McAmish et al. | |
| 2004/0134923 A1 | 7/2004 | Aquino et al. | |
| 2005/0095411 A1 | 5/2005 | Rasmussen | |
| 2005/0123726 A1 | 6/2005 | Broering et al. | |
| 2006/0083900 A1 | 4/2006 | Ashraf | |
| 2006/0093766 A1 | 5/2006 | Savicki et al. | |
| 2007/0166503 A1 | 7/2007 | Hannigan | |
| 2008/0124461 A1 | 5/2008 | Leener et al. | |
| 2009/0029114 A1 | 1/2009 | Cancio et al. | |
| 2009/0068427 A1 | 3/2009 | Patel et al. | |
| 2009/0233041 A1 | 9/2009 | Rasmussen | |
| 2009/0264847 A1 | 10/2009 | Ashton et al. | |
| 2010/0209672 A1 | 8/2010 | Hodjat | |
| 2011/0117307 A1 | 5/2011 | Fraser et al. | |
| 2012/0033900 A1 | 2/2012 | Fraser | |
| 2012/0039550 A1 | 2/2012 | MacPherson | |
| 2012/0040140 A1 | 2/2012 | An et al. | |
| 2012/0063706 A1 | 3/2012 | Fraser et al. | |
| 2012/0064271 A1 | 3/2012 | Broering et al. | |

(56) References Cited

U.S. PATENT DOCUMENTS

2012/0163738 A1  6/2012 Borchardt et al.
2014/0119679 A1  5/2014 Cisek et al.

FOREIGN PATENT DOCUMENTS

WO          9956953        11/1999
WO    WO 2009090208 A1 *  7/2009  ............. B29C 55/18
WO     WO2011060405        5/2011

OTHER PUBLICATIONS

International Search Report, mailed Jan. 22, 2013, from counterpart PCT/US12/65628, filing date Nov. 16, 2012.
International Search Report, mailed Sep. 4, 2013, from counterpart PCT/US2013/050541, filing date Jul. 15, 2013.

* cited by examiner

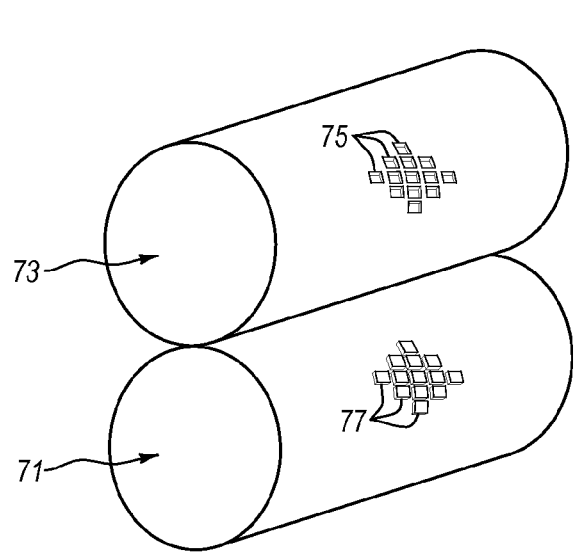
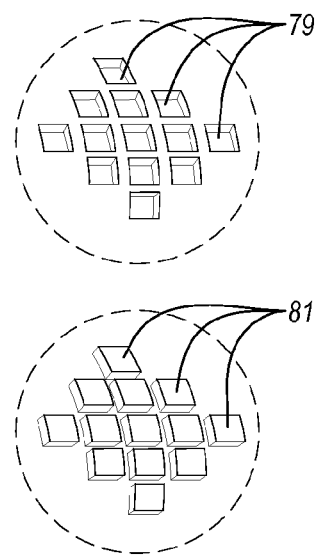
Fig. 12A
Fig. 12B
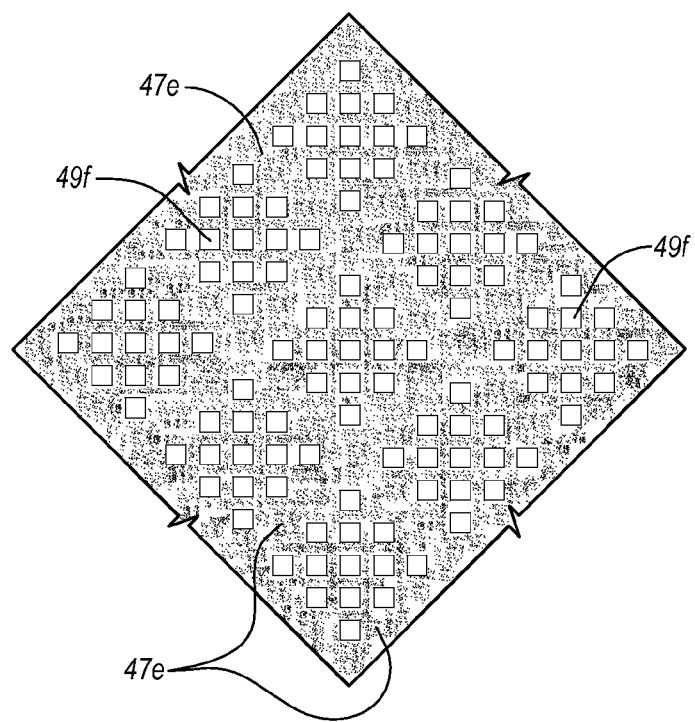
Fig. 12C

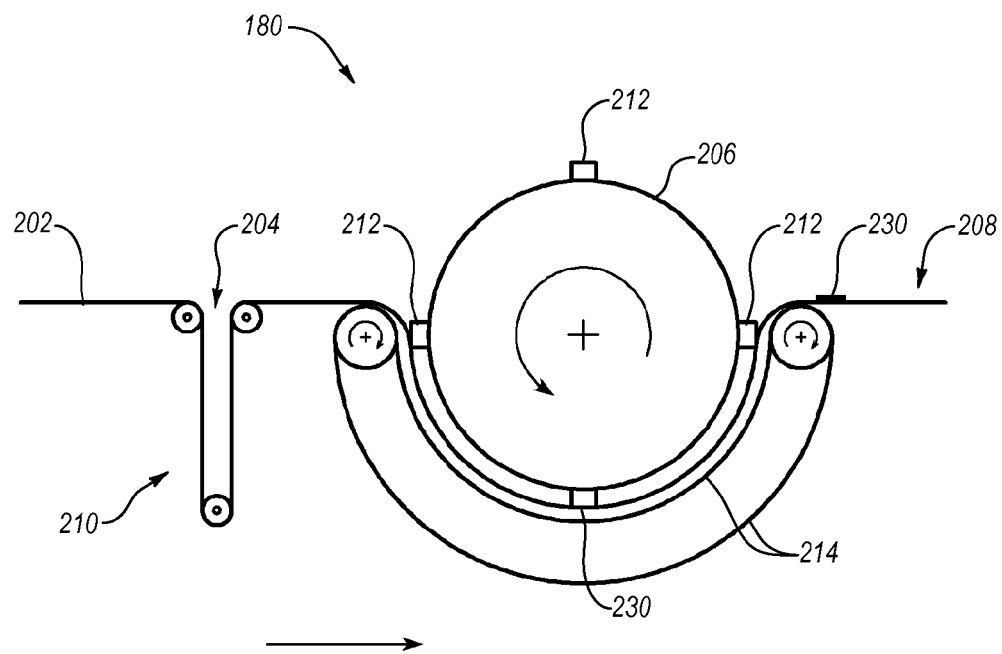
Fig. 18A
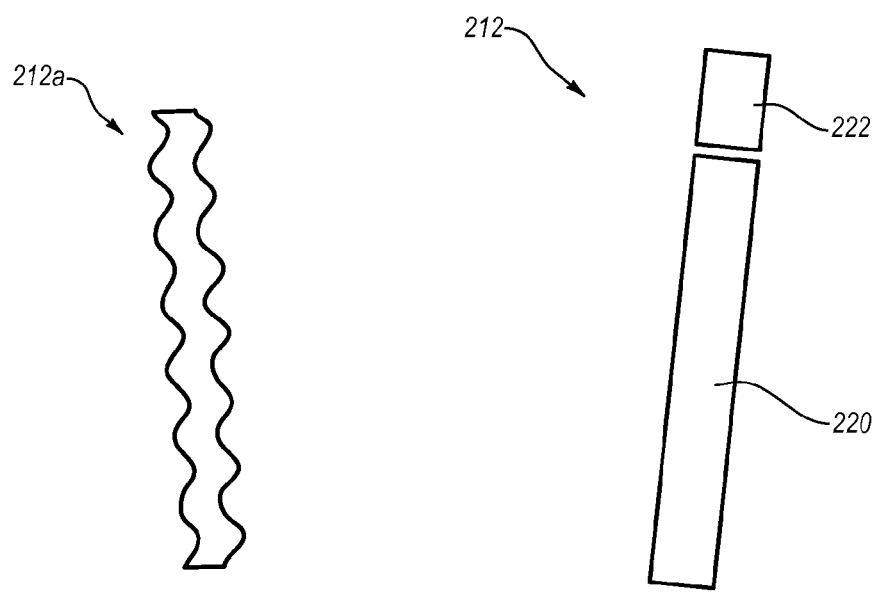
Fig. 18C
Fig. 18B

FILMS AND BAGS WITH VISUALLY DISTINCT REGIONS AND METHODS OF MAKING THE SAME

CROSS-REFERENCE TO RELATED APPLICATIONS

The present application is a continuation-in-part of U.S. patent application Ser. No. 13/660,844, filed Oct. 25, 2012, and entitled "THERMOPLASTIC MULTI-PLY FILM WITH METALLIC APPEARANCE." The present application is also a continuation-in-part of U.S. patent application Ser. No. 13/299,177 filed Nov. 17, 2011 and entitled MULTI-LAYERED LIGHTLY-LAMINATED FILMS AND METHODS OF MAKING THE SAME, which is a continuation in part of U.S. patent application Ser. No. 12/947,025 filed Nov. 16, 2010 and entitled DISCONTINUOUSLY LAMINATED FILM and issued on Dec. 10, 2013 as U.S. Pat. No. 8,603,609, which claims the benefit of and priority to U.S. Provisional Application No. 61/261,673, filed Nov. 16, 2009. This application is also a continuation-in-part of U.S. patent application Ser. No. 13/838,394, filed Mar. 15, 2013, and entitled "DISCONTINUOUSLY LAMINATED FILM STRUCTURES WITH IMPROVED VISUAL CHARACTERISTICS, which is a continuation-in-part of, and claims priority to, U.S. patent application Ser. No. 13/454,412, filed Apr. 24, 2012, entitled THERMOPLASTIC FILMS WITH VISUALLY-DISTINCT STRETCHED REGIONS AND METHODS FOR MAKING THE SAME, which claims priority to U.S. Patent Provisional Application Ser. No. 61/478,639, filed Apr. 25, 2011, entitled THERMOPLASTIC FILMS WITH VISUALLY-DISTINCT STRETCHED REGIONS AND METHODS FOR MAKING THE SAME. U.S. patent application Ser. No. 13/838,394 is also a continuation-in-part of, and claims priority to, U.S. patent application Ser. No. 13/454,474, filed Apr. 24, 2012, entitled MULTI-LAYER FILMS WITH VISUALLY-DISTINCT REGIONS AND METHODS OF MAKING THE SAME, which claims priority to U.S. Patent Provisional Application Ser. No. 61/478,643, filed Apr. 25, 2011, entitled MULTI-LAYER FILMS WITH VISUALLY-DISTINCT REGIONS AND METHODS OF MAKING THE SAME. U.S. patent application Ser. No. 13/838,394 also is a continuation-in-part of, and claims priority to, U.S. patent application Ser. No. 13/552,352, filed Jul. 18, 2012, entitled MULTI-PLY PUCKERED FILMS FORMED BY DISCONTINUOUS LAMINATION OF FILMS HAVING DIFFERENT REBOUND RATIOS, and is a continuation-in-part (CIP) of, and claims priority to, U.S. patent application Ser. No. 13/660,844, filed Oct. 25, 2012, entitled THERMOPLASTIC MULTI-PLY FILM WITH METALLIC APPEARANCE, and is a continuation-in-part (CIP) of, and claims priority to, U.S. patent application Ser. No. 12/947,025, filed Nov. 16, 2010, entitled DISCONTINUOUSLY LAMINATED FILM" and issued on Dec. 10, 2013 as U.S. Pat. No. 8,603,609. The contents of each of the above-referenced applications and patent(s) are hereby incorporated by reference in their entirety.

BACKGROUND

1. The Field of the Invention

The present invention relates generally to thermoplastic films and bags formed therefrom. More particularly, the present invention relates to thermoplastic films and bags including multiple layers and unique aesthetics.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

The cost to produce products including thermoplastic film is directly related to the cost of the thermoplastic film. Recently the cost of thermoplastic materials has risen. In response, many manufacturers attempt to control manufacturing costs by decreasing the amount of thermoplastic material in a given product.

One way manufacturers may attempt to reduce production costs is to use thinner films or stretch the thermoplastic films, thereby increasing surface area and reducing the amount of thermoplastic film needed to produce a product of a given size. Unfortunately, stretched or otherwise thinner thermoplastic films can have undesirable properties. For example, thinner thermoplastic films are typically more transparent or translucent. Additionally, consumers commonly associate thinner films with weakness. Such consumers may feel that they are receiving less value for their money when purchasing products with thinner films; and thus, may be dissuaded to purchase thinner thermoplastic films.

To compensate for some deficiencies of thinner films, manufacturers may add colorants or voiding agents. Depending on how they are used, however, colorants and voiding agents can sometimes weaken the chemical bonds in the film, and create a still weaker film. Moreover, the use of certain colors in a film structure may present unique challenges, such as expensive. For example, metallic pigments, which are often thought of as indicating strength, are particularly expensive. As such, the cost of some pigments can counter any savings gained by the use of thinner films. Furthermore, even pigmented films commonly become less opaque upon stretching.

As such, manufacturers may be dissuaded to stretch a film or use thinner films despite the potential material savings. This is particularly the case when strength is an important feature in the thermoplastic product. For example, thermoplastic trash bags need to be puncture and tear resistant to avoid inadvertently spilling any contents during disposal. Consumers may be hesitant to purchase bags made from thinner films fearing that the bags will fail along the seams or other areas of the bag commonly subjected to stresses.

Accordingly, continued improvement is needed to address the unique problems associated with improving trash bags while conserving the use of expensive thermoplastic materials and pigments.

BRIEF SUMMARY

One or more implementations of the present invention provide benefits and/or solve one or more of the foregoing or other problems in the art with films and bags with a unique appearance and visually-distinct regions. In particular, the appearance of the films can provide multi-layers films with a unique metallic or other appearance that differs from the appearance of the individual layers alone. The films can be non-continuously bonded together and have regions in which the layers are in intimate contact. Such regions can be visually distinct from the other areas of the film in which the layers are not in intimate contact. The visually-distinct regions can provide a visual cue to the consumer about the strength and quality of the film. Furthermore, the visually-distinct regions can provide a unique and pleasing visual effect.

Additional features and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIG. 12A illustrates a schematic diagram of an implementation of embossing intermeshing rollers for use in accordance with one or more implementations of the present invention;

FIG. 12B illustrates a close up of the protrusions and intermeshing recessions of the rollers of FIG. 12A;

FIG. 12C illustrates a view of a multi-layered thermoplastic film with visually-distinct regions created by the intermeshing rollers of FIG. 12A;

FIG. 18A illustrates a sealing process in accordance with one or more implementations of the present invention;

FIG. 18B illustrates a seal bar in accordance with one or more implementations of the present invention;

FIG. 18C illustrates another seal bar in accordance with one or more implementations of the present invention;

DETAILED DESCRIPTION

Figure 1A:
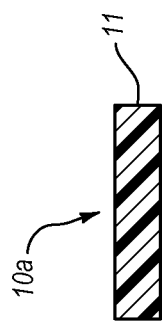
FIGS. 1A-1C illustrate views of various films structures in accordance with one or more implementations of the present invention.

One or more implementations of the present invention include films and bags with a unique appearance and visually-distinct regions. In particular, the appearance of the films can provide multi-layers films with a unique metallic or other appearance that differs from the appearance of the individual layers alone. The films can be non-continuously bonded together and have regions in which the layers are in intimate contact. Such regions can be visually distinct from the other areas of the film in which the layers are not in intimate contact. The visually-distinct regions can provide a visual cue to the consumer about the strength and quality of the film. Furthermore, the visually-distinct regions can provide a unique and pleasing visual effect.

In particular, one or more implementations include a multi-layer film with an outer layer that is substantially un-pigmented and incrementally stretched. The outer layer is non-continuously bonded to a pigmented under-lying layer such that the films are intermittingly in contact with each other. One or more of the spacing between the films, the texture provided by the incremental stretching of the outer layer, and the combination of a substantially un-pigmented and an adjacent pigmented layer can provide the structure with an unexpected appearance that differs from an appearance of the individual layers. For example, the multi-layer film can appear to be a color other than a color of the pigmented layer or the substantially un-pigmented layer (i.e., clear or transparent layer). More specifically, in one example, the multi-layer film can have a metallic appearance. The multi-layer film can have the metallic look despite the lack of any metallic pigment.

One or more implementations can further include bringing portions of the substantially un-pigmented outer layer into intimate or direct contact with the pigmented under layer. Bringing the under and outer layers into direct contact can cause an appearance or color change to the areas or regions in intimate contact. In particular, the areas of intimate contact can lose the unique appearance and instead have the color of the pigmented under-layer. Thus, one or more implementations involve creating visually-distinct regions by bringing the outer and under layers into intimate contact.

One will appreciate in light of the disclosure here that the under and outer layers of the multi-layer film with the unexpected appearance can be brought into intimate contact with each other using various different techniques. In particular, one or more implementations involve heat-sealing the layers of the multi-layer film with the unexpected appearance together. The heat-seals can create intimate contact between the outer substantially un-pigmented layer and the under-laying pigmented layer causing the heat sealed area to take on the visual characteristics of the underlying pigmented film layer. Thus, rather than having the unexpected appearance (for example, a metallic appearance), the heat-sealed areas can appear the color of the pigmented inner layer.

In order to emphasize such visually-distinct areas, one or more embodiments can involve forming wide heat seals. Wide heat seals can comprise heat seals with a width of at least 1/16th of an inch. The increased width of the heat seals can increase the size, and thus, the visual effects of the visually-distinct heat seals.

Additionally or alternatively, one or more implementations can involve bringing the outer and under-lying layers of the multi-layer film with the unexpected appearance into intimate contact with each other via ring rolling, a structural elastic like film (SELF) process, embossing, or other methods. One will appreciate in light of the disclosure herein that a manufacturer can provide a film or a bag with any number of patterns of visually-distinct regions. Consumers can associate the visually-distinct regions with improved properties or strength. For example, the visually-distinct regions can indicate that those regions have undergone a transformation to impart a desirable characteristic to that region (e.g., increased strength). Thus, the visually-distinct regions can serve to notify a consumer that the multi-layered thermoplastic film has been processed to improve the film.

In one or more implementations the combined layers of the multi-layered bag may use less material than a conventional bag, but nonetheless have maintained or increased strength parameters provided by the layers of the bag working in concert with each other. In particular, in one or more implementations the layers of the multi-layered bag are thinner and/or stretched to reduce the amount of thermoplastic material to form a bag of a given size. For instance, one or more layers of the multi-layered bag can be continuously stretched or incrementally stretched to thin the layer and/or increase or otherwise modify the strength parameters of the layers.

In addition to allowing the creation of visually-distinct regions, discontinuous bonding can also enhance the strength and other properties of the film. In particular, one or more implementations provide for forming bonds between adjacent layers of a multi-layer film that are relatively light such that forces acting on the multi-layer film are first absorbed by breaking the bonds rather than or prior to tearing or otherwise causing the failure of the layers of the multi-layer film. Such implementations can provide an overall thinner film employing a reduced amount of raw material that nonetheless has maintained or increased strength parameters. Alternatively, such implementations can use a given amount of raw material and provide a film with increased strength parameters.

In particular, the light bonds or bond regions of adjacent layers of multi-layer films in accordance with one or more implementations can act to first absorb forces via breaking of the bonds prior to allowing that same force to cause failure of the individual layers of the multi-layer film. Such action can provide increased strength to the multi-layer film. In one or more implementations, the light bonds or bond regions include a bond strength that is advantageously less than a weakest tear resistance of each of the individual films so as to cause the bonds to fail prior to failing of the film layers. Indeed, one or more implementations include bonds that the release just prior to any localized tearing of the layers of the multi-layer film.

Thus, in one or more implementations, the light bonds or bond regions of a multi-layer film can fail before either of the individual layers undergoes molecular-level deformation. For example, an applied strain can pull the light bonds or bond regions apart prior to any molecular-level deformation (stretching, tearing, puncturing, etc.) of the individual film layers. In other words, the light bonds or bond regions can provide less resistive force to an applied strain than molecular-level deformation of any of the layers of the multi-layer film. The inventors have surprisingly found that such a configuration of light bonding can provide increased strength properties to the multi-layer film as compared to a monolayer film of equal thickness or a multi-layer film in which the plurality of layers are tightly bonded together (e.g., coextruded).

One or more implementations of the present invention provide for tailoring the bonds or bond regions between layers of a multi-layer film to ensure light bonding and associated increased strength. For example, one or more implementations include modifying or tailoring one or more of a bond strength, bond density, bond pattern, or bond size between adjacent layers of a multi-layer film to deliver a film with strength characteristics better than or equal to the sum of the strength characteristics of the individual layers. Such bond tailoring can allow for multi-layer films at a lower basis weight (amount of raw material) to perform the same as or better than higher basis weight mono-layer or co-extruded films.

Relatively weak bonding and stretching of the two or more layers of the multi-layer film can be accomplished simultaneously through one or more suitable techniques. For example, bonding and stretching may be achieved by pressure (for example MD ring rolling, TD ring rolling, DD ring rolling, stainable network lamination, or embossing), or with a combination of heat and pressure. Alternately, a manufacturer can first stretch the films and then bond the films using one or more bonding techniques. For example, one or more implementations can include ultrasonic bonding to lightly laminate the film layers. Alternately or additionally, adhesives can laminate the films. Treatment with a Corona discharge can enhance any of the above methods. Prior to lamination, the separate layers can be flat film or can be subject to separate processes, such as stretching, slitting, coating and printing, and corona treatment.

As used herein, the terms "lamination," "laminate," and "laminated film," refer to the process and resulting product made by bonding together two or more layers of film or other material. The term "bonding", when used in reference to bonding of multiple layers of a multi-layer film, may be used interchangeably with "lamination" of the layers. According to methods of the present invention, adjacent layers of a multi-layer film are laminated or bonded to one another. The bonding purposely results in a relatively weak bond between the layers that has a bond strength that is less than the strength of the weakest layer of the film. This allows the lamination bonds to fail before the film layer, and thus the film, fails.

The term laminate is also inclusive of coextruded multi-layer films comprising one or more tie layers. As a verb, "laminate" means to affix or adhere (by means of, for example, adhesive bonding, pressure bonding, ultrasonic bonding, corona lamination, and the like) two or more separately made film articles to one another so as to form a multi-layer structure. As a noun, "laminate" means a product produced by the affixing or adhering just described.

In one or more implementations, the light lamination or bonding between layers of a multi-layer film may be non-continuous (i.e., discontinuous or partial discontinuous). As used herein the terms "discontinuous bonding" or "discontinuous lamination" refers to lamination of two or more layers where the lamination is not continuous in the machine direction and not continuous in the transverse direction. More particularly, discontinuous lamination refers to lamination of two or more layers with repeating bonded patterns broken up by repeating un-bonded areas in both the machine direction and the transverse direction of the film.

As used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbounded areas in either the machine direction or the transverse direction.

As used herein, the term "substantially un-pigmented" refers to a thermoplastic ply or plies that are substantially free of a significant amount of pigment such that the ply is substantially transparent or translucent. For example, a "substantially un-pigmented" film can have a pigment concentration (i.e., percent of total composition of the film) that is between 0% and 2%. In some embodiments, a "substantially un-pigmented" film can have a pigment concentration between about 0% and about 1%. In further embodiments, a "substantially un-pigmented" film can have a pigment concentration between about 0% and about 0.75%. As used herein, the term "pigmented" refers to a thermoplastic ply or plies that are pigmented such that the ply has a pigment concentration over 3% or is otherwise substantially opaque.

As used herein, the term "pigment or pigments" are solids of an organic and inorganic nature which are defined as such when they are used within a system and incorporated into the thermoplastic, absorbing part of the light and reflecting the complementary part thereof which forms the color of the thermoplastic ply. Representative, but not limiting, examples of suitable pigments include inorganic colored pigments such as such as iron oxide, in all their shades of yellow, brown, red and black; and in all their physical forms and particle-size categories, chromium oxide pigments, also co-precipitated with nickel and nickel titanates, blue and green pigments derived from copper phthalocyanine, also chlorinated and brominated in the various alpha, beta and epsilon crystalline forms, yellow pigments derived from lead sulphochromate, yellow pigments derived from lead bismuth vanadate, orange pigments derived from lead sulphochromate molybdate lead oxide, cadmium sulfide, cadmium selenide, lead chromate, zinc chromate, nickel titanate, and the like. For the purposes of the present invention, the term "organic pigment" comprises also black pigments resulting from organic combustion (so-called "carbon black"). Organic colored pigments include yellow pigments of an organic nature based on arylamides, orange pigments of an organic nature based on naphthol, orange pigments of an organic nature based on diketo-pyrrolo-pyrole, red pigments based on manganese salts of azo dyes, red pigments based on manganese salts of beta-oxynaphthoic acid, red organic quinacridone pigments, and red organic anthraquinone pigments. Organic colored pigments include azo and diazo pigments, phthalocyanines, quinacridone pigments, perylene pigments, isoindolinone, anthraquinones, thioindigo, solvent dyes and the like.

Pigments can be light reflecting (e.g., white pigments) or light absorbing (e.g., black pigments). Examples of pigments suitable for one or more implementations include titanium dioxide, Antimony Oxide, Zinc Oxide, Carbonate, White Lead, Lithopone, Clay, Magnesium Silicate, Barytes (BaSO4), and Calcium Carbonate (CaCO3)

Film Materials

As an initial matter, the thermoplastic material of the films of one or more implementations can include, but are not limited to, thermoplastic polyolefins, including polyethylene and copolymers thereof and polypropylene and copolymers thereof. The olefin based polymers can include the most common ethylene or propylene based polymers such as polyethylene, polypropylene, and copolymers such as ethylene vinylacetate (EVA), ethylene methyl acrylate (EMA) and ethylene acrylic acid (EAA), or blends of such polyolefins.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber.

The examples and description herein below refer to films formed from linear low-density polyethylene. The term "linear low-density polyethylene" (LLDPE) as used herein is defined to mean a copolymer of ethylene and a minor amount of an olefin containing 4 to 10 carbon atoms, having a density of from about 0.910 to about 0.926, and a melt index (MI) of from about 0.5 to about 10. For example, some examples herein use an octene comonomer, solution phase LLDPE (MI=1.1; $\rho$=0.920). Additionally, other examples use a gas phase LLDPE, which is a hexene gas phase LLDPE formulated with slip/AB (MI=1.0; $\rho$=0.920). Still further examples use a gas phase LLDPE, which is a hexene gas phase LLDPE formulated with slip/AB (MI=1.0; $\rho$=0.926). One will appreciate that the present invention is not limited to LLDPE, and can include "high density polyethylene" (HDPE), "low density polyethylene" (LDPE), and "very low density polyethylene" (VLDPE). Indeed films made from any of the previously mentioned thermoplastic materials or combinations thereof can be suitable for use with the present invention.

Indeed, implementations of the present invention can include any flexible or pliable thermoplastic material that may be formed or drawn into a web or film. Furthermore, the thermoplastic materials may include a single layer or multiple layers. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain, and when the applied strain is released the web materials return, to a degree, to their pre-strained condition.

In addition to a thermoplastic material, films of one or more implementations of the present invention can also include one or more additives. Additional additives that may be included in one or more embodiments include slip agents, anti-block agents, voiding agents, or tackifiers. Additionally, one or more implementations of the present invention include films that are devoid of voiding agents. Some examples of voiding agents include calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, etc.

One will appreciate in light of the disclosure herein that manufacturers may form the films or webs to be used with one or more implementations of the present invention using a wide variety of techniques. For example, a manufacturer can form precursor mix of the thermoplastic material and one or more additives. The manufacturer can then form the film(s) from the precursor mix using conventional flat or cast extrusion or coextrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. This is related to the different physical characteristics possessed by films made by the two conventional film-making processes; casting and blowing. Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (monoaxial orientation), the resulting film can exhibit strength and stiffness along the direction of stretch, but can be weak in the other direction, i.e., across the stretch, often splitting when flexed or pulled. To overcome this limitation, two-way or biaxial orientation can be employed to more evenly distribute the strength qualities of the film in two directions. Most biaxial orientation processes use apparatus that stretches the film sequentially, first in one direction and then in the other.

In one or more implementations, one or more films of the present invention are blown film, or cast film. Blown film and cast film is formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present invention, can be a single screw type modified with a blown film die, an air ring, and continuous take off equipment.

In one or more implementations, a manufacturer can use multiple extruders to supply different melt streams, which a feed block can order into different channels of a multichannel die. The multiple extruders can allow a manufacturer to form a multi-layered film with layers having different compositions. Such multi-layer film may later be non-continuously laminated with another layer of film to provide one or more benefits of the present invention.

In a blown film process, the die can be an upright cylinder with a circular opening. Rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more embodiments, the extrusion process can orient the polymer chains of the blown film. The "orientation" of a polymer is a reference to its molecular organization, i.e., the orientation of molecules or polymer chains relative to each other. In particular, the extrusion process can cause the polymer chains of the blown film to be predominantly oriented in the machine direction. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more embodiments the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more embodiments the polymer chains of the blown film are predominantly oriented in the machine direction (i.e., oriented more in the machine direction than the transverse direction).

The films of one or more implementations of the present invention can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present invention may not be uniform. Thus, the starting gauge of films of one or more implementations of the present invention may vary along the length and/or width of the film.

As an initial matter, one or more layers of the films described herein can comprise any flexible or pliable material comprising a thermoplastic material and that can be formed or drawn into a web or film. As described above, the film includes a plurality of layers of thermoplastic films. Each individual film layer may itself include a single layer or multiple layers. In other words, the individual layers of the multi-layer film may each themselves comprise a plurality of laminated layers. Such layers may be significantly more tightly bonded together than the bonding provided by the purposely weak discontinuous bonding in the finished multi-layer film. Both tight and relatively weak lamination can be accomplished by joining layers by mechanical pressure, joining layers with adhesives, joining with heat and pressure, spread coating, extrusion coating, and combinations thereof. Adjacent sub-layers of an individual layer may be coextruded. Coextrusion results in tight bonding so that the bond strength is greater than the tear resistance of the resulting laminate (i.e., rather than allowing adjacent layers to be peeled apart through breakage of the lamination bonds, the film will tear).

Figure 1B:
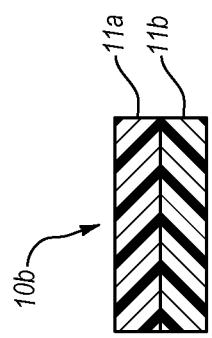

FIG. 1A illustrates a film ply 10a of a single layer 11. In another implementation, as illustrated by FIG. 1B, a film ply 10b can have two layers (i.e., a bi-layered film). In particular, the film ply 10b can include a first layer 11a and a second layer 11b. The first and second layers 11a, 11b can optionally include different grades of thermoplastic material or include different additives, including polymer additives. In still another implementation, shown in FIG. 1C, a film ply 10c can include three layers (i.e., a tri-layered film). For example, FIG. 1C illustrates that the film 10c can include a first layer 11c, a second layer 11d, and a third layer 11e.

In one example, the film 10a can comprise a 0.5 mil, 0.920 density LLDPE, black film containing 4.8% carbon black. In an alternative embodiment, the film 10a can comprise a 0.5 mil, 0.920 density LLDPE, un-pigmented film that appears clear or substantially clear.

Figure 1C:
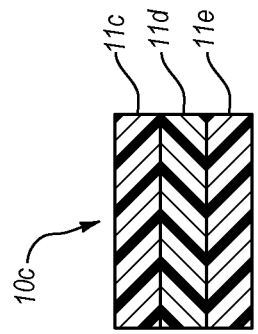

In at least one implementation, such as shown in FIG. 1C, a multilayered film 10c can include co-extruded layers. For example, the film 10c can include a three-layer B:A:B structure, where the ratio of layers can be 20:60:20. The exterior B layers (i.e., 11c, 11e) can comprise a mixture of hexene LLDPE of density 0.918, and metallocene LLDPE of density 0.918. The interior A core layer (11d) can comprise a mixture of hexene LLDPE of density 0.918, butene LLDPE of density 0.918, reclaimed resin from trash bags. Additionally, the A core layer 11d can include a pigment. For example, the A core layer 11d can include a colorant containing carbon black in an amount between about 0.1 percent and about 6%.

In another example, the film 10c is a coextruded three-layer B:A:B structure where the ratio of layers is 15:70:15. The A core layer 11d can comprise a LLDPE material, and the B outer layers 11c, 11e can include added C6 olefin LLDPE. The LLDPE material can have a MI of 1.0 and density of 0.920 g/cm3. The B:A:B structure can also optionally have a ratio of B:A that is greater than 20:60 or less than 15:70. In one or more implementations, the LLDPE can comprise greater than 50% of the overall thermoplastic material in the film 10c.

In another example, the film 10c is a coextruded three-layer C:A:B structure where the ratio of layers is 20:60:20. The C layer 11c can comprise a LLDPE material with a first colorant (e.g., black). The B layer 11e can also comprise a LLDPE material with a second colorant (e.g., white). The LLDPE material can have a MI of 1.0 and density of 0.920 g/cm3. The A core layer 11d can comprise similar materials to any of the core layer describe above. The A core layer 11d can comprise a black colorant or can be clear.

In any event, one or more implementations involve forming a multi-layer film with a metallic or color that is distinct from the color and appearance of the individual layers of the multi-layer film. For example, a pigmented under layer can have a black appearance while the outer layer has a clear or transparent appearance. When combined to form a multi-layer film in accordance the principles described herein, the resultant multi-layer film can have a metallic, silvery or grey color rather than a black appearance or color as would be expected. Once such a multi-layer film with a unique appearance is formed, one or more implementations of the present invention involve bringing regions or areas of the two layers into intimate contact with each other to create visually-distinct regions that have the color or appearance of the pigmented layer. For example, a multi-layer film with a black inner or under layer and a transparent outer layer can have a silver metallic appearance and black visually-distinct regions where the two films are in intimate contact with each other.

One will appreciate in light of the disclosure herein that the methods of bringing the layers of the multi-layer film together to form visually-distinct areas can be performed as part of the process of forming the multi-layer film or as additional acts. For example, the process of discontinuously bonding the layers of a pigmented and an adjacent un-pigmented layer can act to both form the multi-layer film with a unique appearance and simultaneously create visually-distinct regions. In particular, a ring rolling, SELFing, embossing, or other discontinuous bonding process can both bond the pigmented and adjacent un-pigmented layer together and create visually-distinct regions.

Alternatively, once a multi-layer film with a unique appearance is created, additional processing steps can be performed to form the visually-distinct regions. For example, a manufacturer can perform a ring rolling, SELFing, embossing, heat sealing, or other process on a multi-layer film with a unique appearance to create visually-distinct areas that have the color or appearance of the pigmented layer. One will appreciate in light of the disclosure herein that one or more implementations of the present invention can involve any number of variations or combinations of acts and processes to form a multi-layer film with a unique appearance and visually-distinct areas or regions.

Figure 2:
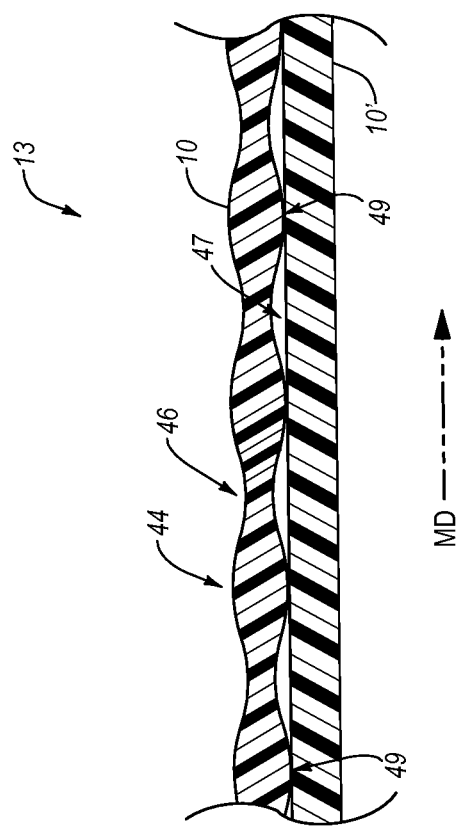
FIG. 2 illustrates a view of a multi-layer film with areas in which two layers are in intimate contact in accordance with one or more implementations of the present invention.

In any event, a multi-layer film with a unique appearance can comprise a film with an un-pigmented and incrementally-stretched outer layer that is discontinuously bonded to a pigmented under layer. For example, FIG. 2 illustrates one example of a multi-layer film 13 with unique appearance (e.g., metallic appearance). The multi-layer film 13 includes an outer layer 10 and an inner or under layer 10'. Each of the layers can comprise any of the films 10a-10c described above or a film with more than three layers.

In any event, the outer layer 10 can be un-pigmented such that the film is clear or transparent. The outer layer 10 can further be incrementally stretched. For example, FIG. 2 illustrates that the outer layer 10 includes alternating series of stretched (or more stretched) regions or thinner webs 46 adjacent to un-stretched regions (or less stretched) or thicker ribs 44. As explained in greater detail below, the manufacturer can incrementally stretch the outer layer 10 using one or more of ring rolling or SELFing.

FIG. 2 further illustrates that the outer layer 10 of the multi-layer film 13 is discontinuously bonded to the inner layer 10'. In particular, the multi-layer film 13 can include bonded regions or bonds 49 and un-bonded regions 47. For example, FIG. 2 illustrates that the film layers 10, 10' of the multi-layer film 13 are laminated together at the thicker ribs 44 while the stretched (i.e., thinner) regions 46 may not be laminated together. In particular, a gap 47 or un-bonded region can separate the film layers 10, 10'.

As explained previously, the configuration of the multi-layer film 13 can provide the multi-layer film 13 with a metallic, gray, silvery, or other unexpected appearance when viewing the outer layer 10. The unexpected appearance is un-expected typically viewing a pigmented film through a clear or transparent film would appear as the color of the pigment rather than having a different color or appearance.

As shown by FIG. 2, the bonded regions 49 can comprise areas in which the outer layer 10' is in direct or intimate contact with the inner layer 10'. As such, the bonded regions 49 can be visually distinct from the rest of the multi-layer film. In other words, because the clear or transparent film 10 is directly abutted against the pigmented film 10', the bonded regions can have the color or appearance of the pigmented film 10'. Thus, when the pigmented film 10' is a black film, the bonded regions 49 can appear black with the unbounded regions 47 (i.e., the thinner webs 46 and transitions between the bonds 49 and the thinner webs) can appear metallic, grey, or another unexpected appearance.

FIG. 2 illustrates that the bonded regions 49 are aligned with and co-extensive with the thicker ribs 44. One will appreciate in light of the disclosure herein that the present invention is not so limited. For example, in alternative embodiments the bonds or bonded regions 49 are aligned with but not co-extensive with the thicker ribs 44. In still further embodiments, the bonds or bonded regions 49 may cross or otherwise interface with the thicker ribs 44 but may not be aligned with or co-expensive with the thicker ribs. In yet further embodiments, the bonds or bonded regions 49 may not interface with the thicker ribs 44.

Figure 3A:
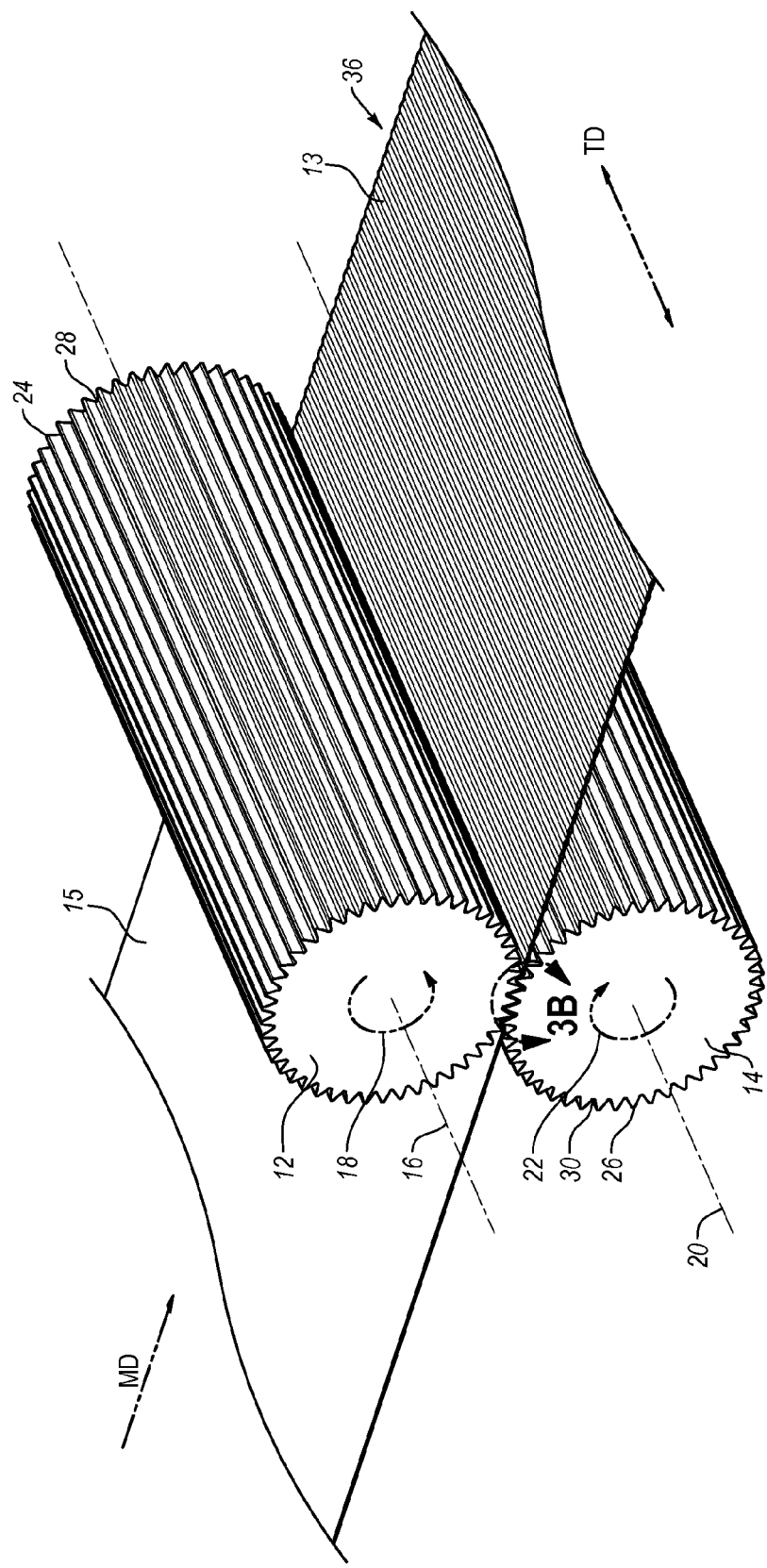
FIG. 3A illustrates a schematic diagram of two thermoplastic films being brought into intimate contact and laminated by MD intermeshing rollers in accordance with one or more implementations of the present invention.
Figure 3B:
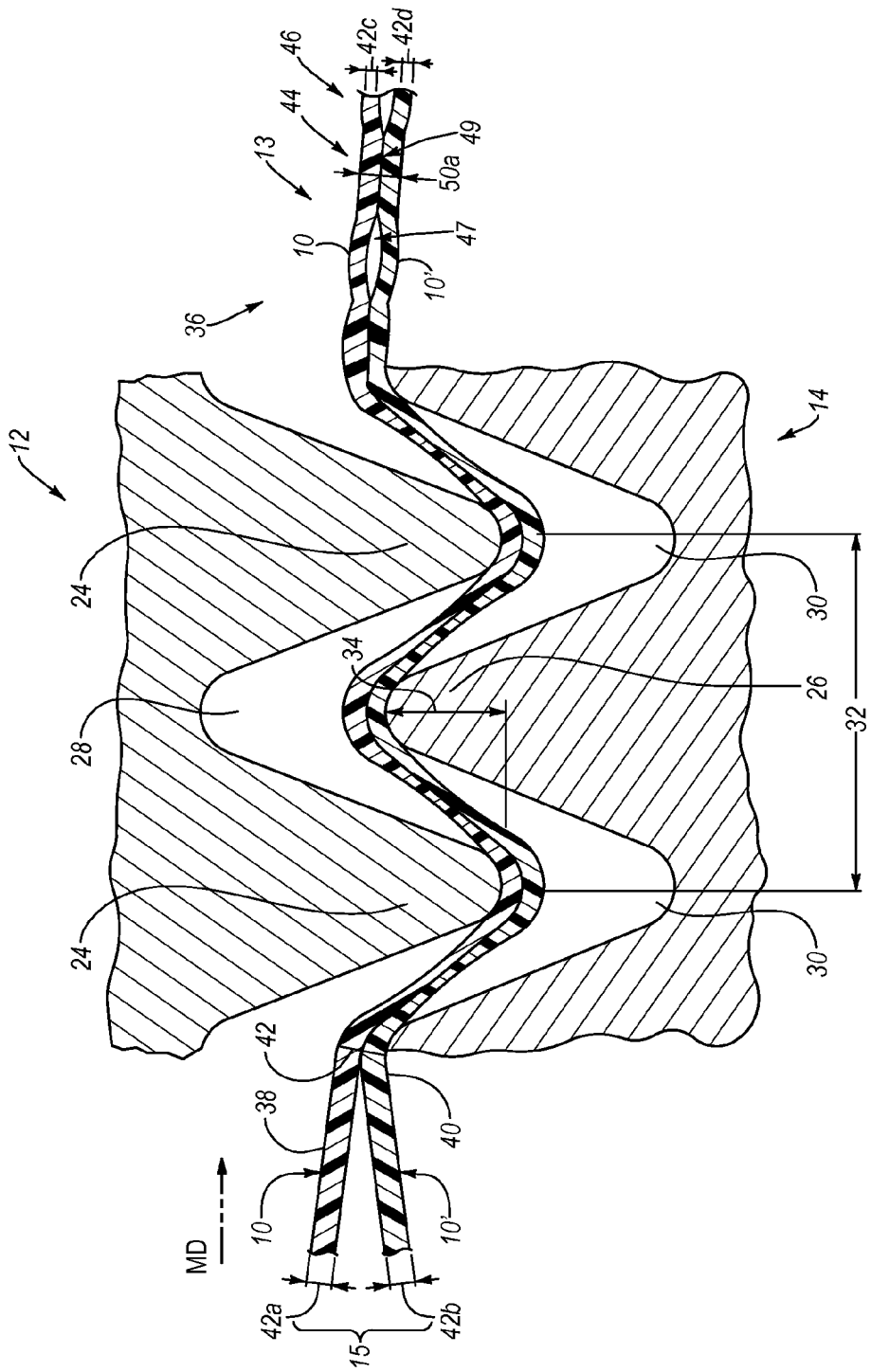
FIG. 3B illustrates an enlarged view of the two thermoplastic films passing together through the intermeshing rollers of FIG. 3A taken along the circle 3B of FIG. 3A.

As previously mentioned, according to one implementation of the invention, the separate layers are non-continuously bonded to one another and incrementally stretched to form a multi-layer film 13 as described above in relation to FIG. 2. FIGS. 3A-3B illustrate exemplary processes of partially discontinuously bonding adjacent layers 15 in accordance with an implementation of the present invention to create a multi-layer film 13. In particular, FIGS. 3A-3B illustrate an MD ring rolling process that partially discontinuously laminates individual adjacent layers 15 by passing the layers through a pair of MD intermeshing rollers 12, 14. As a result of MD ring rolling, the multi-layered film 13 is also intermittently stretched in the machine direction MD.

As shown by the FIGS. 3A-3B, the first roller 12 and the second roller 14 can each have a generally cylindrical shape. The MD intermeshing rollers 12, 14 may be made of cast and/or machined metal, such as, steel, aluminum, or any other suitable material. The MD intermeshing rollers 12, 14 can rotate in opposite directions about parallel axes of rotation. For example, FIG. 3A illustrates that the first roller 12 can rotate about a first axis 16 of rotation in a counter-clockwise direction 18. FIG. 3A also illustrates that the second roller 14 can rotate about a second axis 20 of rotation in a clockwise direction 22. The axes of rotation 16, 20 can be parallel to the transverse direction TD and perpendicular to the machine direction MD.

The intermeshing rollers 12, 14 can closely resemble fine pitch spur gears. In particular, the MD intermeshing rollers 12, 14 can include a plurality of protruding ridges 24, 26. The ridges 24, 26 can extend along the MD intermeshing rollers 12, 14 in a direction generally parallel to axes of rotation 16, 20 and perpendicular to the machine direction of the film 13 passing through the MD intermeshing rollers 12, 14. Furthermore, the ridges 24, 26 can extend generally radially outward from the axes of rotation 16, 20. The tips of ridges 24, 26 can have a variety of different shapes and configurations. For example, the tips of the ridges 24, 26 can have a rounded shape as shown in FIG. 3B. In alternative implementations, the tips of the ridges 24, 26 can have sharp angled corners. FIGS. 3A-3B also illustrate that grooves 28, 30 can separate adjacent ridges 24, 26.

The ridges 24 on the first roller 12 can be offset or staggered with respect to the ridges 26 on the second roller 14. Thus, the grooves 28 of the first roller 12 can receive the ridges 26 of the second roller 14, as the MD intermeshing rollers 12, 14 intermesh. Similarly, the grooves 30 of the second roller 14 can receive the ridges 24 of the first roller 12.

One will appreciate in light of the disclosure herein that the configuration of the ridges 24, 26 and grooves 28, 30 can prevent contact between ridges 24, 26 during intermeshing so that no rotational torque is transmitted during operation. Additionally, the configuration of the ridges 24, 26 and grooves 28, 30 can affect the amount of stretching and the bond strength resulting from partially discontinuous lamination as the film layers 15 pass through MD intermeshing rollers 12, 14.

Referring specifically to FIG. 3B, various features of the ridges 24, 26 and grooves 28, 30 are shown in greater detail. The pitch and depth of engagement of the ridges 24, 26 can determine, at least in part, the amount of incremental stretching and partially discontinuous lamination caused by the MD intermeshing rollers 12, 14. As shown by FIG. 3B, the pitch 32 is the distance between the tips of two adjacent ridges on the same roller. The "depth of engagement" ("DOE") 34 is the amount of overlap between ridges 24, 26 of the different MD intermeshing rollers 12, 14 during intermeshing.

The ratio of DOE 34 to pitch 32 can determine, at least in part, the bond strength provided by the partially discontinuous bonding. According to one embodiment, the ratio of DOE to pitch provided by any ring rolling operation is less than about 1.1:1, suitably less than about 1.0:1, suitably between about 0.5:1 and about 1.0:1, or suitably between about 0.8:1 and about 0.9:1.

As shown by FIG. 3A, the direction of travel of the film layers 15 through the MD intermeshing rollers 12, 14 is parallel to the machine direction and perpendicular to the transverse direction. As the thermoplastic film layers 15 pass between the MD intermeshing rollers 12, 14, the ridges 24, 26 can incrementally stretch the film layers 15 in the machine direction. In one or more implementations, stretching the film layers 15 in the machine direction can reduce the gauge of the film and increase the length of the film layers 15. In other implementations, the film layers 15 may rebound after stretching such that the gauge of the film layers 15 are not decreased. Furthermore, in one or more implementations, stretching the film layers 15 in the machine direction can reduce the width of the film layers 15. For example, as film layers 15 are lengthened in the machine direction, the length of the film layers 15 can be reduced in the transverse direction.

In particular, as the film layers 15 proceed between the MD intermeshing rollers 12, 14, the ridges 24 of the first roller 12 can push the film layers 15 into the grooves 30 of the second roller 14 and vice versa. The pulling of the film layers 15 by the ridges 24, 26 can stretch the film layers 15. The MD intermeshing rollers 12, 14 may not stretch the film layers 15 evenly along their length. Specifically, the MD intermeshing rollers 12, 14 can stretch the portions of the film layers 15 between the ridges 24, 26 more than the portions of the film layers 15 that contact the ridges 24, 26. Thus, the MD intermeshing rollers 12, 14 can impart or form a generally striped pattern 36 into the film layers 15. As used herein, the terms "impart" and "form" refer to the creation of a desired structure or geometry in a film upon stretching the film that will at least partially retain the desired structure or geometry when the film is no longer subject to any strains or externally applied forces.

FIGS. 3A-3B illustrate that the film layers 15 (i.e., the films that are yet to pass through the MD intermeshing rollers 12, 14) can have a substantially flat top surface 38 and substantially flat bottom surface 40. As seen in FIG. 3B, the multi-layer film 13 may comprise two layers 10 and 10' that are initially separate from one another. The film layers 15 can have an initial thickness or starting gauge 42 (i.e., the sum of 42a and 42b) extending between its major surfaces (i.e., the top surface 38 and the bottom surface 40). In at least one implementation, the starting gauge 42, as well as the gauge 42a, 42b of individual layers 10 and 10' can be substantially uniform along the length of the film layers 15. Because the inner surfaces of each layer 10 and 10' are somewhat tacky, the layers become lightly bonded together as they are pulled through and stretched by MD intermeshing rollers 12, 14. Those areas that are un-stretched or stretched less become bonded together.

In one or more implementations, the film layers 15 need not have an entirely flat top surface 38, but may be rough or uneven. Similarly, bottom surface 40 or the inner oriented surfaces of layers 10 and 10' of the film layers 15 can also be rough or uneven. Further, the starting gauge 42, 42a, and 42b need not be consistent or uniform throughout the entirety of film layers 15. Thus, the starting gauge 42, 42a, and 42b can vary due to product design, manufacturing defects, tolerances, or other processing issues. According to one embodiment, one or more of the individual layers 10 and 10c' may be pre-stretched (e.g., through MD ring rolling, TD ring rolling, etc.) before being positioned adjacent to the other layer (10' or 10, respectively). Such pre-stretching of individual layers can result in a striped surface exhibiting an uneven top and bottom surface similar to that seen in FIG. 3A.

FIG. 3B illustrates that film layers 15, can include two initially separate film layers 10, 10'. In an alternative implementation, the film layers 15 (and thus the resultant multi-layer film 13) can include three initially separate film layers: a middle film layer and two outer film layers. In other embodiments, more than three layers may be provided (four, five, six, or more partially discontinuously or discontinuously laminated layers).

As seen in FIG. 3A, upon stretching and partially discontinuously laminating the adjacent layers 15, the intermittingly bonded and stretched multi-layer film 13 can include a striped pattern 36. The striped pattern 36 can include alternating series of stretched (or more stretched) regions or thinner webs 46 adjacent to un-stretched regions (or less stretched) or thinner ribs 44. FIG. 3B illustrates that the MD intermeshing rollers 12, 14 can incrementally stretch and partially discontinuously bond films 10, 10' to create the multi-layer film 13 including bonded regions or bonds 49 and un-bonded regions 47. For example, FIG. 3B illustrates that the film layers 10, 10' of the multi-layer film 13 can be laminated together at the thicker ribs 44 while the stretched (i.e., thinner) regions 46 may not be laminated together.

In addition to any compositional differences between layers 10, 10' of a given multi-layer film, the different film layers can have differing gauges or thicknesses. In one or more implementations, the film layers may be substantially equal to one another in thickness. For example, the inventors have found that the MD or TD tear resistance of the composite, multi-layer film is typically approximately equal to the lowest MD or TD tear value of the individual layers, absent any increase in tear resistance provided by light bonding. In other words, the weakest layer often determines the strength of the multi-layer film structure.

As shown by FIG. 3B the bonded regions 49 of the multi-layer film 13 can have an average thickness or gauge 50a. The average gauge 50a can be approximately equal to the combined starting gauges 42a, 42b of the starting films. In the Figures, separation between the layers at unbonded regions 47 is exaggerated for purposes of clarity. In one or more implementations, the average gauge 50a can be less than the combined starting gauges 42a-42b. The films 10, 10' of the un-bonded regions 47 can each have an average thickness or gauge 42c, 42d. In one or more implementations, the average gauges 42c, 42d are less than the starting gauges 42a, 42b. Although the un-stretched regions or thicker ribs 44 of the multi-layered lightly-laminated films may be stretched to a small degree by MD intermeshing rollers 12,14 (or stretched in a separate operation), the un-stretched regions or thicker ribs 44 may be stretched significantly less compared to the stretched regions 46.

In any event, FIGS. 3A-3B illustrate that MD intermeshing rollers 12, 14 can process the initially separately layered films 15 into MD incrementally-stretched multi-layer film 13. As previously mentioned, the MD incrementally-stretched multi-layer film 13 can include a striped pattern 36 where the bonding occurs along a continuous line or region along the width of the film, parallel to the TD direction. The striped pattern 36 can include alternating series of un-bonded regions 47 and bonded regions 49. The bonded regions 49 can comprise bonds between un-stretched regions or thicker ribs 44 of the films 10, 10'. In other words, the bonds of the MD incrementally-stretched multi-layer film 13 can be positioned directly between, be aligned with, and bond together un-stretched regions or thicker ribs 44. Along related lines, the un-bonded regions 47 can separate the stretched or thinner regions 46.

Figure 4:
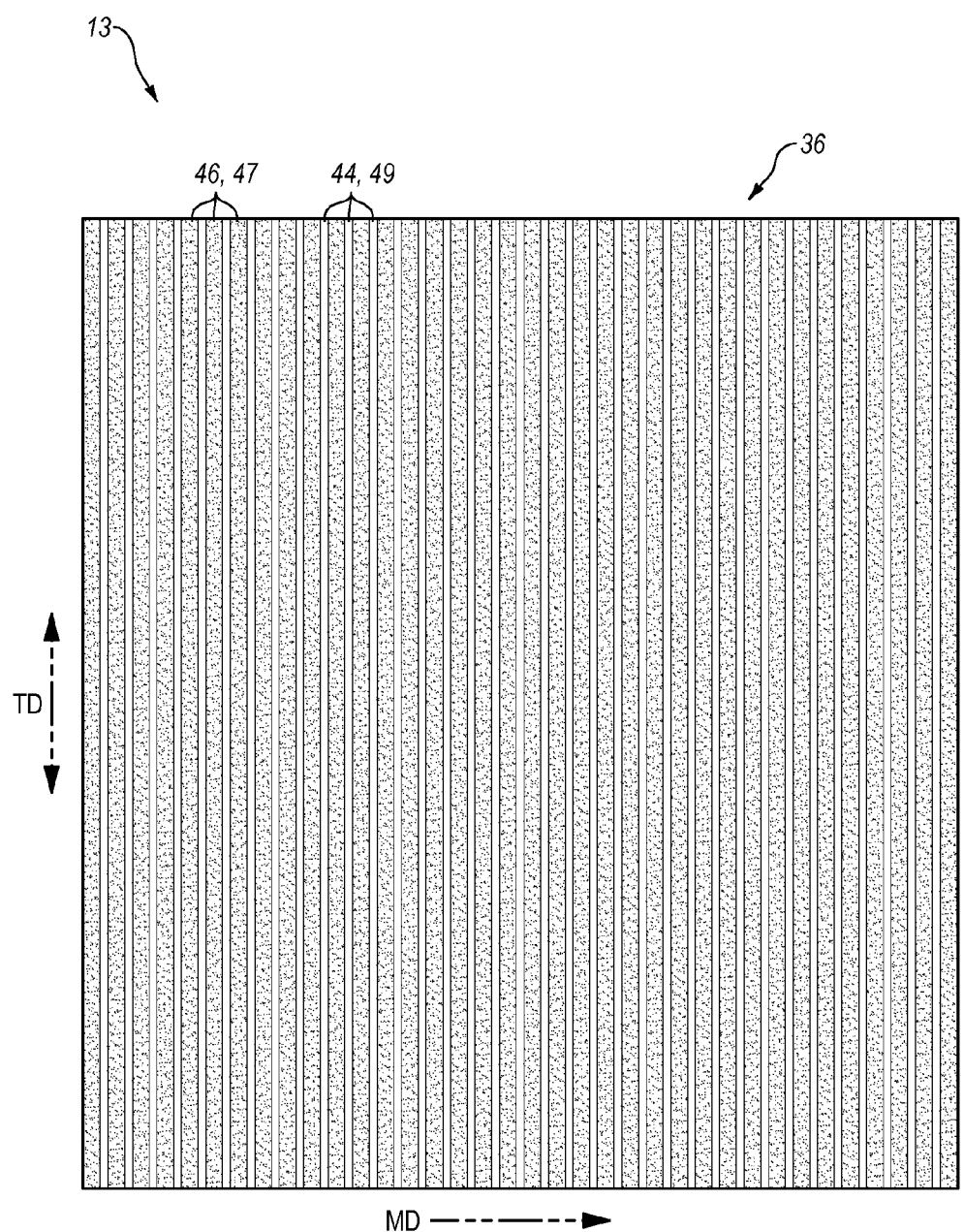
FIG. 4 illustrates a view of a multi-layered thermoplastic film with visually distinct regions created by passing thermoplastic films through the intermeshing rollers of FIG. 3A.

FIG. 4 illustrates a top view of the MD incrementally-stretched multi-layer film 13. As shown by FIG. 4, the multi-layer film 13 includes thicker ribs 44 bonded together to form bonded regions 49 adjacent to thinner regions 46 that form un-bonded regions 47. In addition to resulting in partially discontinuous lamination of adjacent layers, MD ring rolling the film layers 15 can increase or otherwise modify one or more of the tensile strength, tear resistance, impact resistance, or elasticity of the film layers 15, in addition to whatever additional strength is provided by the partially discontinuous, low strength bonds between adjacent layers of the film. Such bonds can be broken to absorb forces rather than such forces resulting in tearing of the film.

Furthermore, thicker ribs 44 can include bonded stripes that extend across the film 13 in a direction transverse (i.e., transverse direction) to a direction in which the film was extruded (i.e., machine direction). As shown by FIG. 4, the bonded stripes or bonded regions 49 can extend across the entire length of the film 13. One will appreciate in light of the disclosure herein that the striped pattern 36 may vary depending on the method used to incrementally stretch and partially discontinuously bond adjacent layers 15. To the extent that MD or other ring rolling is used to lightly bond the film 13, the striped pattern 36 (e.g., width and spacing of the stripes or stretched regions 44) on the film 13 can depend on the pitch 32 of the ridges 24, 26, the DOE 34, and other factors. As regions 49 represent areas of the multi-layer film in which the adjacent layers are bonded to one another, it will be apparent that altering the spacing and/or width of regions 49 can affect the overall strength of the film. For example, providing more bonded surface area relative to the unbonded surface area can increase the density of such bonds that can absorb forces, increasing the film strength.

FIG. 4 further illustrates that the bonded regions 49 can be intermittently dispersed about un-bonded regions 47. In particular, each bonded region 49 can reside between adjacent un-bonded regions 47. Along related lines, each thicker rib 44 can be intermittently dispersed about stretched regions 46. The striped pattern 36 may vary depending on the method used to lightly laminate the film 13. In one or more implementations, the molecular structure of the thermoplastic material of the film multi-layered 13 may be rearranged during stretching (e.g., particularly so during cold stretching).

One will appreciate in light of the disclosure herein that passing the film layers 15 through the MD intermeshing rollers 12, 14 to form the multi-layer film 13 can also modify the orientation of the film. In particular, MD stretching a predominately MD oriented film can further orient the stretched regions 46 in the machine direction. Thus, the stretched regions 46 can have an MD orientation that is greater than the MD orientation of the thicker ribs 44.

Additionally, the bonded regions 49 and thicker ribs 44 can be visually distinct from the un-bonded regions 47 and thinner regions 46 as a result bring the inner and outer layers 10, 10' in direct contact as described above. One will appreciate that the size of the upper surfaces of the ridges 24, 26 can dictate the visibility of any visually-distinct regions created by the MD ring rolling. For example, in one or more embodiments bonded regions 49 with a width less than 1/16th of an inch may be somewhat difficult to detect or see. As such, in one or more embodiments the upper surfaces of the ridges 24, 26 can have a width equal to or greater than about 1/16th. In particular, in one or more embodiments the upper surfaces of the ridges 24, 26 can have a width of between about 1/16th of an inch and about 1 inch.

Referring to FIG. 4, the dotted areas/shaded areas of the multi-layer film 13 can have a metallic or other unexpected appearance, while the non-dotted areas (in this case stripes) can have the appearance/color of pigmented inner layer 10'. For example, when the pigmented film 10' is black, the dotted areas/shaded areas can have a silvery or grey metallic appearance while the non-dotted areas have a black appearance.

Figure 5A:
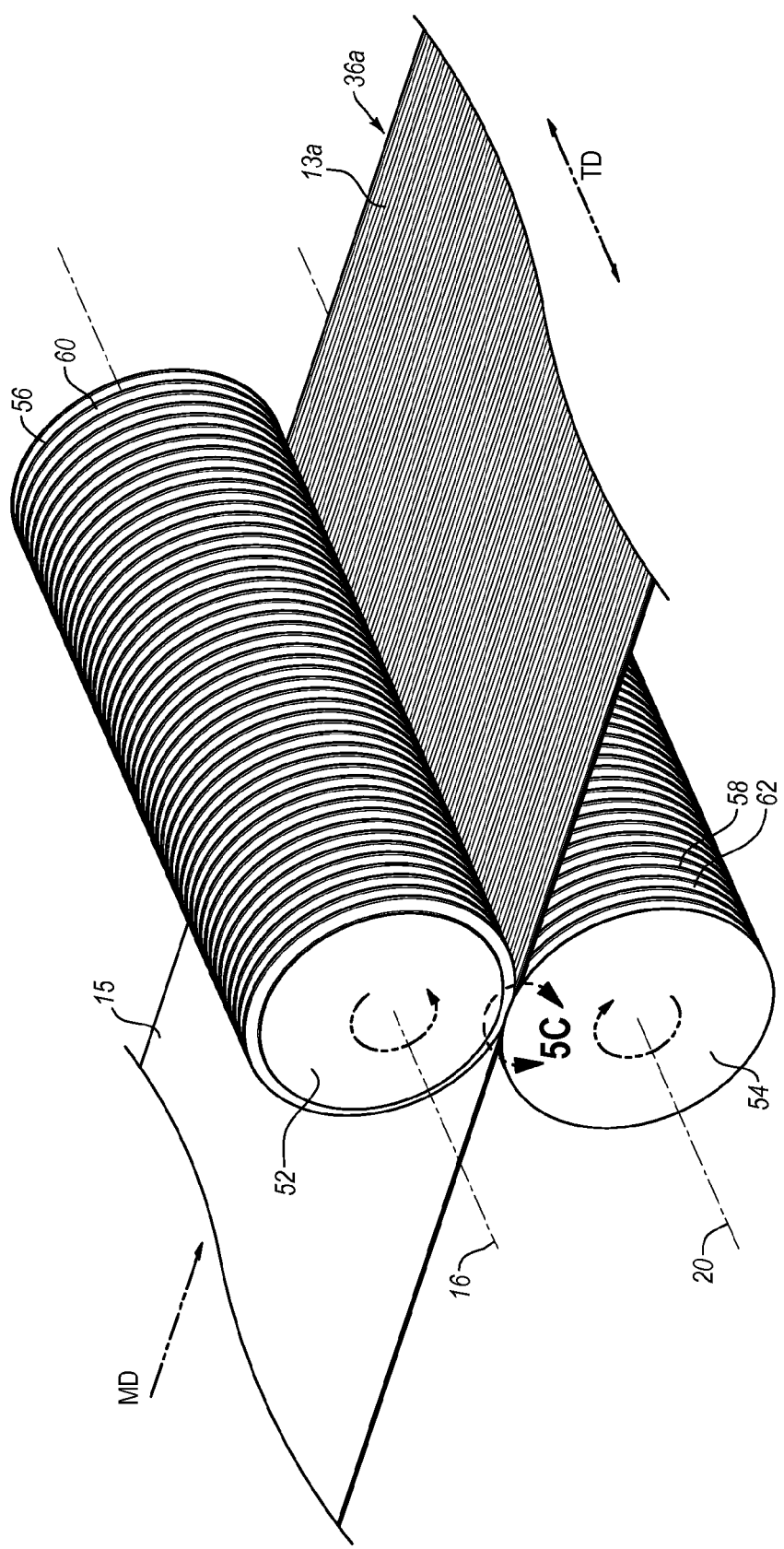
FIG. 5A a schematic diagram of two thermoplastic films being brought into intimate contact and laminated by TD intermeshing rollers in accordance with one or more implementations of the present invention.
Figure 5D:
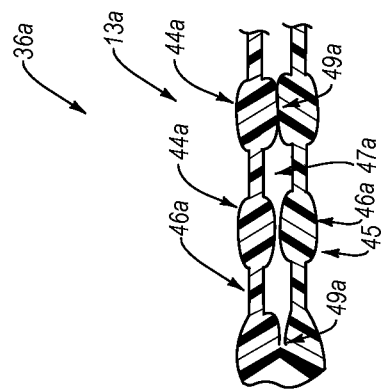
FIG. 5D illustrates an enlarged view of the multi-layer film after passing through the intermeshing rollers of FIG. 5A.
Figure 5C:
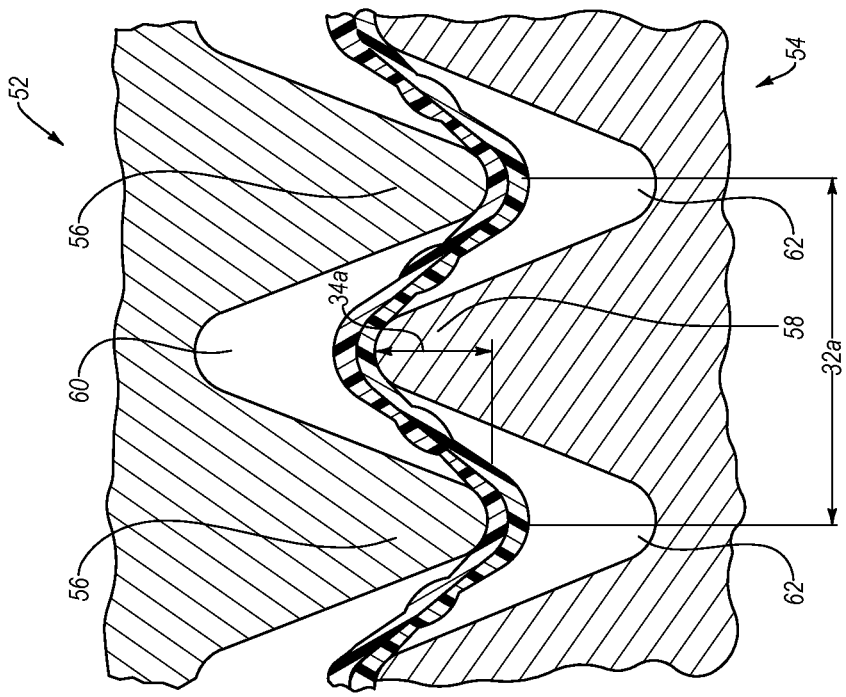
FIG. 5C illustrates an enlarged view of the films passing through the intermeshing rollers of FIG. 5A taken along the circle 5C of FIG. 5A.
Figure 5B:
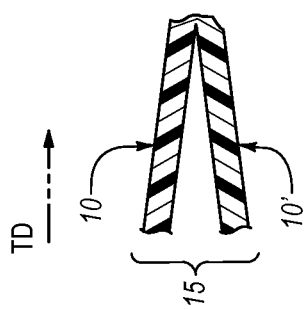
FIG. 5B illustrates an enlarged view of the films prior to passing through the intermeshing rollers of FIG. 5A.

MD ring rolling is one exemplary method of partially discontinuously laminating a multi-layer film. TD ring rolling is another suitable method of discontinuously or partially discontinuously laminating a film. For example, FIGS. 5A-5D illustrates a TD ring rolling process that partially discontinuously and lightly bonds adjacent layers 15 by passing the film layers 15 through a pair of TD intermeshing rollers 52, 54. In particular, FIG. 5B illustrates thermoplastic films 15 prior to passing the film through the pair of TD intermeshing rollers 52, 54. FIG. 5C illustrates the thermoplastic films 15 as the films passes through the pair of TD intermeshing rollers 52, 54. FIG. 5D illustrates a resultant multi-layer film 13a created from the thermoplastic films 15 passing through the pair of TD intermeshing rollers 52, 54.

A TD ring rolling process (and associated TD intermeshing rollers 52, 54) can be similar to the MD ring rolling process (and associated MD intermeshing rollers 12, 14) described herein above, except that the ridges 56, 58 and grooves 60, 62 of the TD intermeshing rollers 52, 54 extend generally orthogonally to the axes of rotation 16, 20 (i.e., parallel to the MD direction). Thus, as shown by FIG. 5A, as the thermoplastic film layers 15 passes between the intermeshing rollers 52, 54, the ridges 56, 58 can incrementally stretch and lightly bond adjacent layers 15. The resultant TD incrementally-stretched and incrementally-bonded multi-layer film 13 can include a striped pattern 36a within the with adjacent bonded and unbonded regions.

In particular, as the films 10, 10' proceed between the TD intermeshing rollers 52, 54, the ridges 56 of the first roller 52 can push the films 10, 10' into the grooves 62 of the second roller 54 and vice versa. The pulling of the films 10, 10' by the ridges 56, 58 can stretch the films 10, 10'. The rollers 52, 54 may not stretch the films 10, 10' evenly along their length. Specifically, the rollers 52, 54 can stretch the portions of the films 10, 10' between the ridges 56, 58 more than the portions of the films 10, 10' that contact the ridges 56, 58, or vice versa. Thus, the rollers 52, 54 can impart or form a ribbed pattern 36a into resultant multi-layer film 13a.

The TD intermeshing rollers 52, 54 can form thick regions or thicker ribs 44a, thinner webs 46a, and bonds 49a in the films 10, 10'. In one or more implementations, the adjacent thick ribs 44a of the films 10, 10' can be joined by bonds 49a. In addition to forming ribs 46a, 44a and bonds 49a, TD ring rolling the films 10, 10' can increase or otherwise modify one or more of the tensile strength, tear resistance, impact resistance, or elasticity of the films 10, 10', in addition to whatever additional strength is provided by the partially discontinuous bonds 49a between adjacent layers.

To the extent that TD or other ring rolling is used to bond the films 10, 10', the ribbed pattern 36a (e.g., width and spacing of the ribs 46a, 44a) can depend on the pitch 32a of the ridges 56, 58, the DOE 34a, and other factors. As portions of the films 10, 10' including a ribbed pattern 36a also represent areas of the multi-layer film in which the adjacent layers are non-continuously bonded to one another, it will be apparent that altering the spacing and/or width of ribs 46a, 44a can affect the overall strength of the film. For example, providing more bonded surface area relative to the unbonded surface area can increase the density of such bonds 49a that can absorb forces, increasing the film strength.

FIG. 5D further illustrates that the bonds 49a can bond thick linear ribs 44a of the layers 10, 10' together. In particular, the bonds 49a can be coextensive and aligned with opposing thicker ribs 44a and bond them together. FIG. 5D illustrates that the bonds 49a can secure some, but not all, of the thick linear ribs 44a of one layer to the thick linear ribs 44a of an adjacent layer. In particular, FIG. 5D illustrates that bonds 49a can secure every other thick linear rib 44a of adjacent layers together. The unbounded thicker ribs 44a can form unbounded regions 45. In alternative implementations, bonds 49a can secure each thick linear rib 44a of adjacent layer together.

Figure 6:
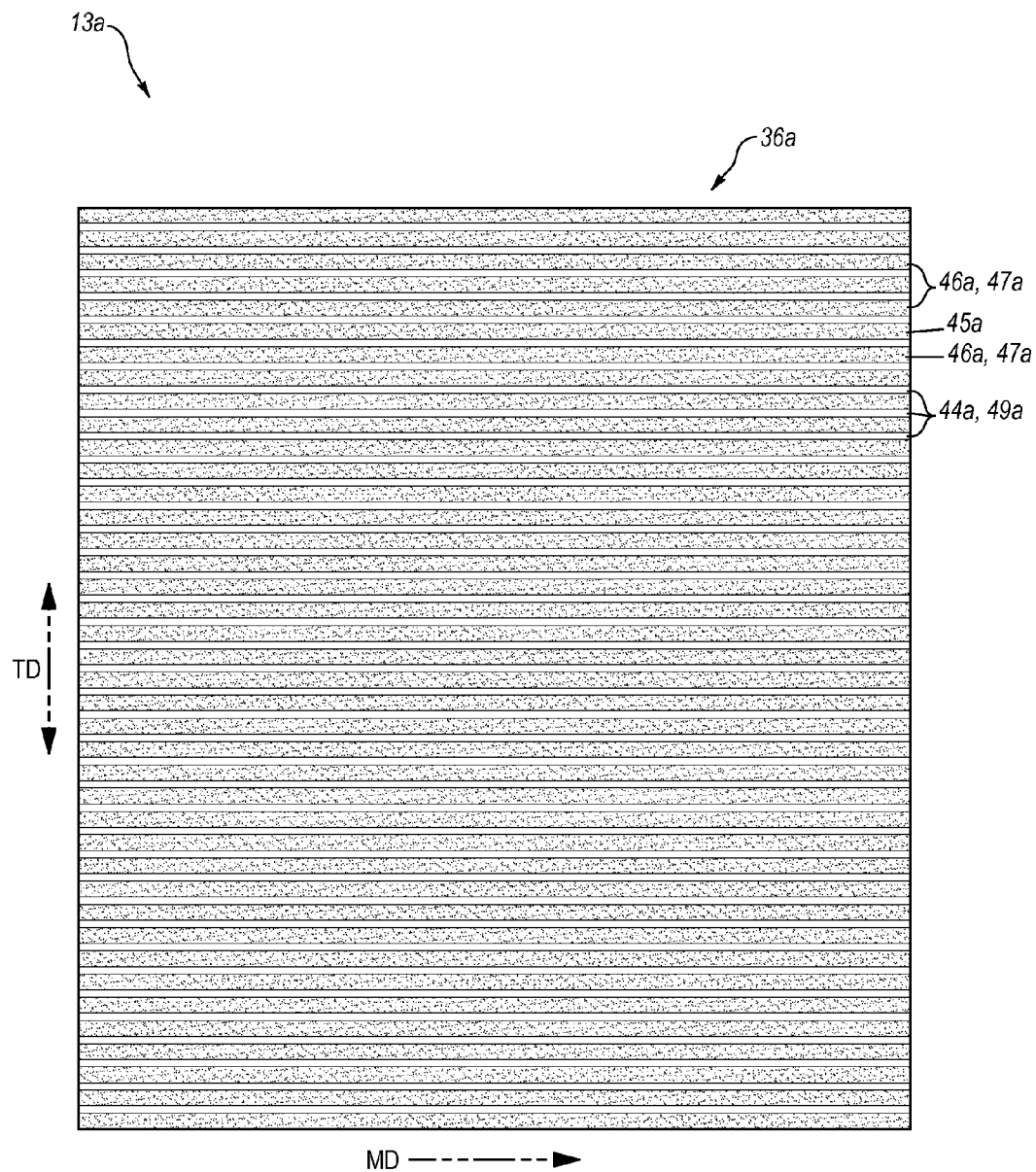
FIG. 6 illustrates a view of a multi-layered thermoplastic film with visually-distinct regions created by passing thermoplastic films through the intermeshing rollers of FIG. 5A.

FIG. 6 illustrates a top view of the TD incrementally-stretched and incrementally-bonded multi-layer film 13a. As shown by FIG. 6, the multi-layer film 13a includes thicker ribs 44a bonded together to form bonded regions 49a adjacent to thinner regions 46a that form un-bonded regions 47a with bonded regions 49a and adjacent un-bonded regions 45a. Similar to MD ring rolling, TD ring rolling the thermoplastic films can result in relatively light, partially discontinuous bonding of adjacent layers 10c, 10c', increasing the strength of the multi-layer film 13a.

FIG. 6 illustrates that the bonded regions 49a can include stripes that extend across the multi-layer film 13a in the machine direction. As shown by FIG. 6, the stripes or bonded regions 49a can extend across the entire width of the multi-layered lightly-laminated film 15b. In alternative implementations, bonded regions 49a can extend across only a portion of the multi-layer film 13a. Similar to MD ring rolling, the pitch and the DOE of the ridges 56, 58 of the intermeshing rollers 52, 54 can affect the width and spacing of the stripes or bonded regions 49a, as well as the strength of the light bonds formed between adjacent layers, thereby affecting the overall increase in strength provided by the processing.

Additionally, the bonded regions 49a and thicker ribs 44a can be visually distinct from the un-bonded regions 47a and thinner regions 46a as a result bring the inner and outer layers 10, 10' in direct contact as described above. One will appreciate that the size of the upper surfaces of the ridges 56, 58 can dictate the visibility of any visually-distinct regions created by the TD ring rolling. For example, in one or more embodiments bonded regions 49a with a width less than 1/16th of an inch may be somewhat difficult to detect or see. As such, in one or more embodiments the upper surfaces of the ridges 56, 58 can have a width equal to or greater than about 1/16th. In particular, in one or more embodiments the upper surfaces of the ridges 56, 58 can have a width of between about 1/16th of an inch and about 1 inch. In other embodiments, the bonded regions 49a can purposefully have a width less than 1/16th an inch.

Referring to FIG. 6, the dotted areas/shaded areas of the multi-layer film 13a can have a metallic or other unexpected appearance, while the non-dotted areas (in this case stripes) can have the appearance/color of pigmented inner layer 10'. For example, when the pigmented film 10' is black, the dotted areas/shaded areas can have a silvery or grey metallic appearance while the non-dotted areas have a black appearance.

Figure 7A:
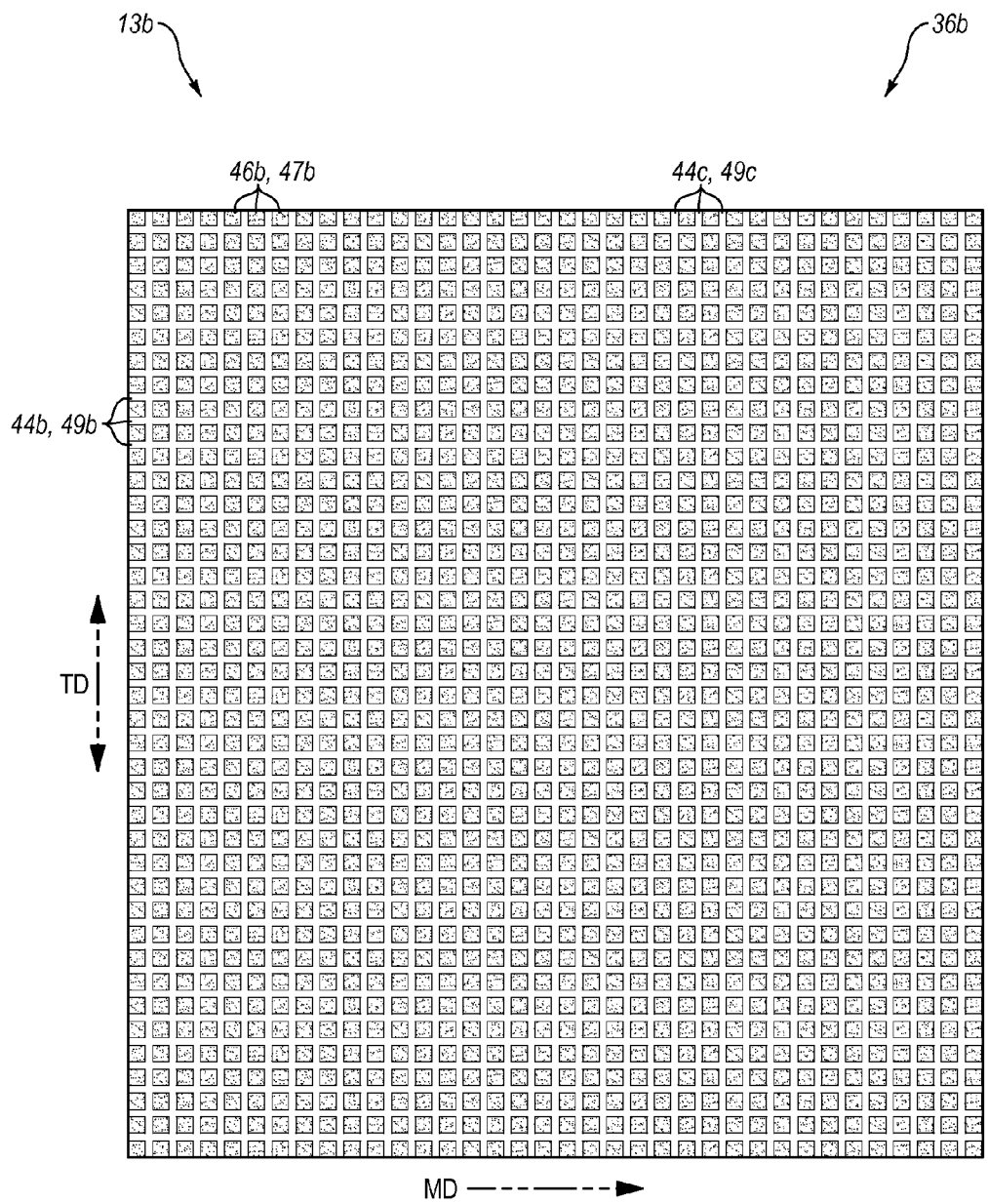
FIG. 7A illustrates a view of a multi-layered thermoplastic film with visually-distinct regions created by passing thermoplastic film through the intermeshing rollers of both FIG. 3A and FIG. 5A.

In still further implementations, one or more of the layers 10, 10' can undergo both an MD ring rolling process and a TD ring rolling process to create the multi-layer film with a metallic appearance and optionally visually-distinct regions. For example, FIG. 7A illustrates a top view of a MD & TD incrementally-stretched and incrementally-bonded multi-layer film 13b. The multi-layer film 13b includes thicker ribs 44b, 44c bonded together to form bonded regions 49b, 49c adjacent to thinner regions 46b that form un-bonded regions 47b. The multi-layer film 13b can have a grid pattern 36b including alternating series of un-bonded regions 47b and bonded regions 49b, 49c. In particular, un-bonded regions 47b may comprise a plurality of discrete squares or rectangles while the remainder of the surface comprises a grid of horizontal and vertical bonded regions that are connected together. The bonded regions 49b, 49c can include stripes 49b that extend along the multi-layer film 13b in the machine direction, and stripes 49c that extend along the film in the transverse direction, which cross each other. As shown by FIG. 7A, in one or more implementations, the aspect ratio of the rows and columns of the bonded regions 49b, 49c can be approximately 1 to 1. In alternative implementations, the aspect ratio of the rows and columns of bonded regions 49b, 49c can be greater or less than 1 to 1, for example, as explained in greater detail in relation to FIG. 13.

The multi-layer film 13b with bonded regions and adjacent un-bonded regions created by MD and TD ring rolling can allow for greater material savings by further increasing the surface area of a given portion of film, by increasing the density of light lamination bonds within a given area, and may also provide properties or advantages not obtained by MD or TD ring rolling alone.

Additionally, the bonded regions 49b, 49c and thicker ribs 44b, 44c can be visually distinct from the un-bonded regions 47b and thinner regions 46b as a result bring the inner and outer layers 10, 10' in direct contact as described above. One will appreciate that the size of the upper surfaces of the ridges 24, 26, 56, 58 can dictate the visibility of any visually-distinct regions created by the MD ring rolling. For example, in one or more embodiments bonded regions 49b, 49c with a width less than 1/16th of an inch may be somewhat difficult to detect or see. As such, in one or more embodiments the upper surfaces of the ridges 24, 26, 56, 58 can have a width equal to or greater than about 1/16th. In particular, in one or more embodiments the upper surfaces of the ridges 24, 26, 56, 58 can have a width of between about 1/16th of an inch and about 1 inch. Furthermore, the ridges 24, 26 of the MD ring rollers 12, 14 can have a different width than the ridges 56, 58 of the TD ring rollers 52, 54. In such implementations, the stripes 49c may be more visibly-distinct than the stripes 49b or vice versa.

The dotted areas/shaded areas of the multi-layer film 13b can have metallic appearance, while the non-dotted areas (in this case stripes) can have the appearance/color of pigmented inner layer 10'. For example, when the pigmented film 10' is black, the dotted areas/shaded areas can have a silvery or grey metallic appearance while the non-dotted areas have a black appearance.

Figure 7B:
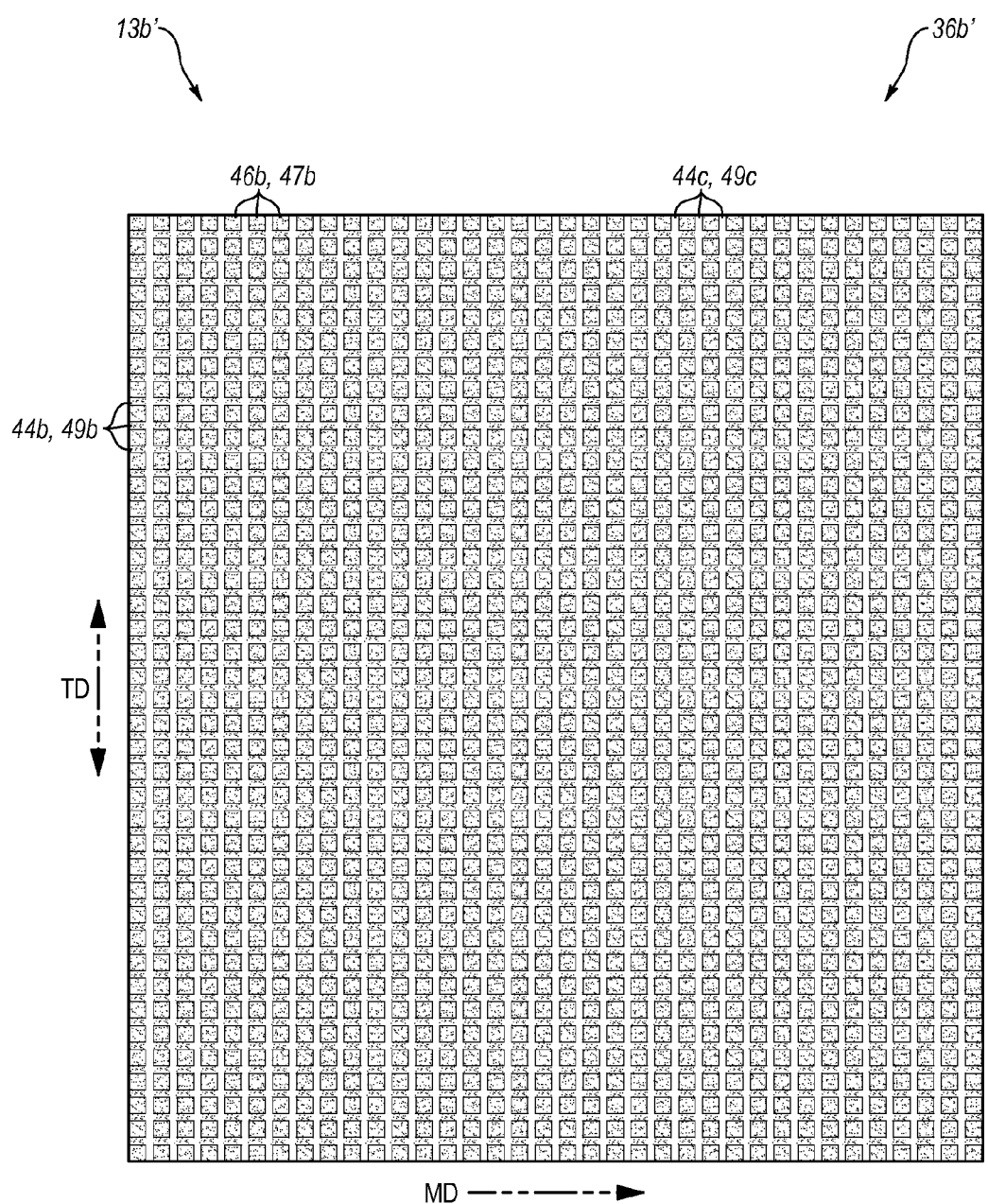
FIG. 7B illustrates a view of another multi-layered thermoplastic film with visually-distinct regions created by passing thermoplastic film through the intermeshing rollers of both FIG. 3A and FIG. 5A.

FIG. 7A illustrates a multi-layer film 13b in which both the outer layer 10 and the inner layer 10' passed together through the MD ring rollers 12, 14 and the TD ring rollers 52, 54. In alternative embodiments, one of the outer layer 10 and the inner layer 10' can pass through one of the MD or TD ring rollers separately prior to the films 15 passing together through the other of the MD or TD ring rollers. For example, FIG. 7B illustrates a multi-layer film 13b' in which the outer layer 10 was MD incrementally-stretched prior to passing together with the inner layer 10' through the TD ring rollers 52, 54 to TD incrementally-stretched and discontinuously bonded to the layers 15 together. As shown, the MD extending stripes 44b can have a metallic appearance while the TD extending stripes 44c have an appearance/color of the inner layer 10'. Furthermore, the intersection of the MD extending stripes 44b and the TD extending strips 44c can be visually distinct from the rest of the TD extending stripes 44c such the film 13b' has a stitched appearance.

Figure 8:
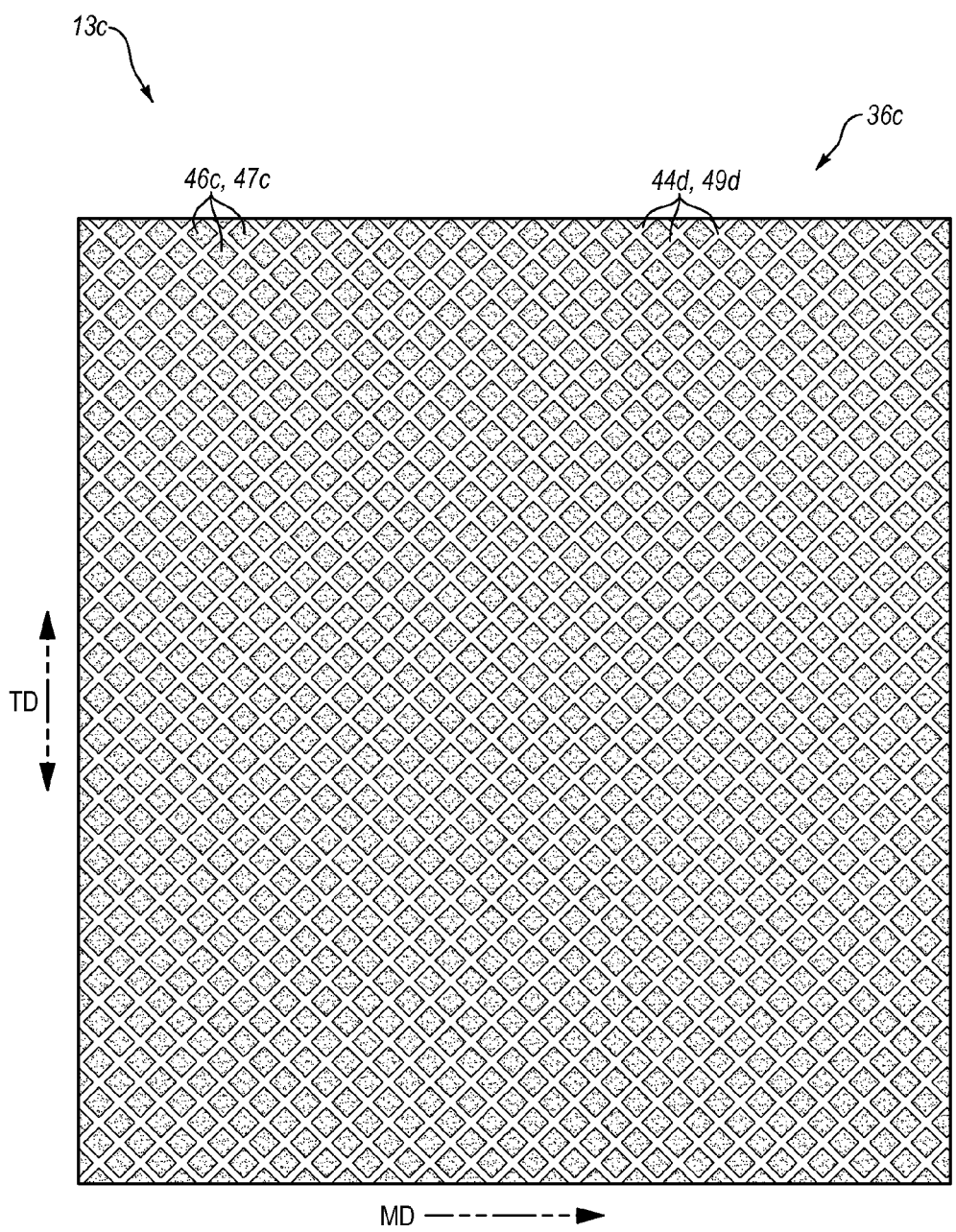
FIG. 8 illustrates a view of a multi-layered thermoplastic film with visually-distinct regions created by passing thermoplastic films through diagonal direction intermeshing rollers in accordance with one or more implementations of the present invention.

In yet further implementations, a manufacturer can use diagonal or helical (DD) ring rolling. DD ring rolling processes (and associated DD intermeshing rollers) can be similar to the MD ring rolling process (and associated MD intermeshing rollers 12, 14) described herein above, except that the ridges and grooves of the DD intermeshing rollers can extend at an angle relative to the axes of rotation. In particular, the ridges and grooves of the DD ring rollers can extend at an angle of between about 15 degrees and about 75 degrees relative to the axes of rotation (or the MD or TD directions). FIG. 8 illustrates a DD incrementally-stretched and incrementally-bonded multi-layer film 13c formed by bonding two films together by passing the films through DD ring rollers. As shown the multi-layer film 13c can have a diamond pattern 36c. The diamond pattern 36c can include alternating series of diamond-shaped thinner regions 46c defining un-bonded areas or regions 47c and thicker ribs 44a secured by bonds to form bonded regions 49d.

The bonded regions can include stripes 49d oriented at an angle relative to the transverse direction such that the stripes 49d are neither parallel to the transverse or machine direction. The illustrated configuration may be achieved with two ring rolling operations, similar to that of FIG. 7A, but in which the DD ring rollers of each operation are angularly offset relative to one another (e.g., one providing an angle of about 45° off of MD ring rolling, the other providing an angle of about 45° off of TD ring rolling). One will appreciate that DD ring rolling the film can biaxially orient the thinner, stretched regions 46c. In particular, orient the thinner, stretched regions 46c at an angle to the machine direction and the transverse direction. Furthermore, the bonded regions 49d can be visually-distinct from the non-bonded regions 47c as describe above in relation to the bonded regions 49-49c and non-bonded regions 47-47b.

In accordance with another implementation, a structural elastic like film (SELF) process may be used to create a thermoplastic film with strainable networks, which similarly results in discontinuous bonding of adjacent layers within a multi-layer film. As explained in greater detail below, the strainable networks can include adjacent bonded and un-bonded regions. U.S. Pat. No. 5,518,801; U.S. Pat. No. 6,139,185; U.S. Pat. No. 6,150,647; U.S. Pat. No. 6,394,651; U.S. Pat. No. 6,394,652; U.S. Pat. No. 6,513,975; U.S. Pat. No. 6,695,476; U.S. Patent Application Publication No. 2004/0134923; and U.S. Patent Application Publication No. 2006/0093766 each disclose processes for forming strainable networks or patterns of strainable networks suitable for use with implementations of the present invention. The contents of each of the aforementioned patents and publications are incorporated in their entirety by reference herein.

Figure 9:
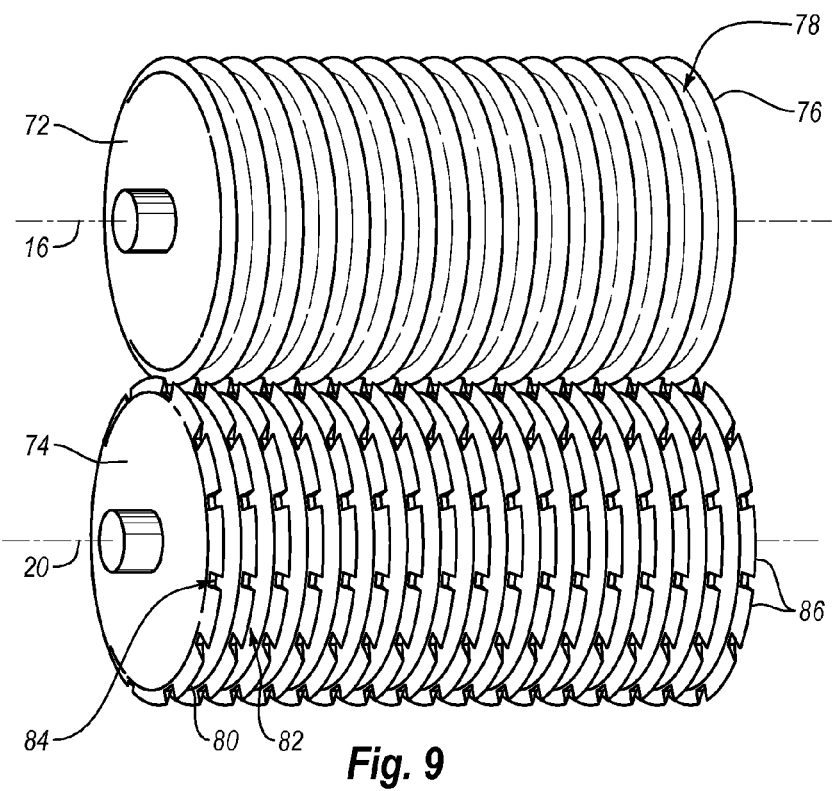
FIG. 9 illustrates a schematic diagram of a set of intermeshing rollers used to form a structural elastic like film (SELF) by imparting strainable networks into the film while lightly laminating adjacent layers of a film in accordance with one or more implementations of the present invention.

FIG. 9 illustrates a pair of SELF'ing intermeshing rollers 72, 74 for creating strainable networks with lightly bonded regions in a film. The first SELF'ing intermeshing roller 72 can include a plurality of ridges 76 and grooves 78 extending generally radially outward in a direction orthogonal to an axis of rotation 16. Thus, the first SELF'ing intermeshing roller 72 can be similar to a TD intermeshing roller 52, 54. The second SELF'ing intermeshing roller 74 can include also include a plurality of ridges 80 and grooves 82 extending generally radially outward in a direction orthogonal to an axis of rotation 20. As shown by FIG. 9, however, the ridges 80 of the second SELF'ing intermeshing roller 74 can include a plurality of notches 84 that define a plurality of spaced teeth 86.

Figure 10:
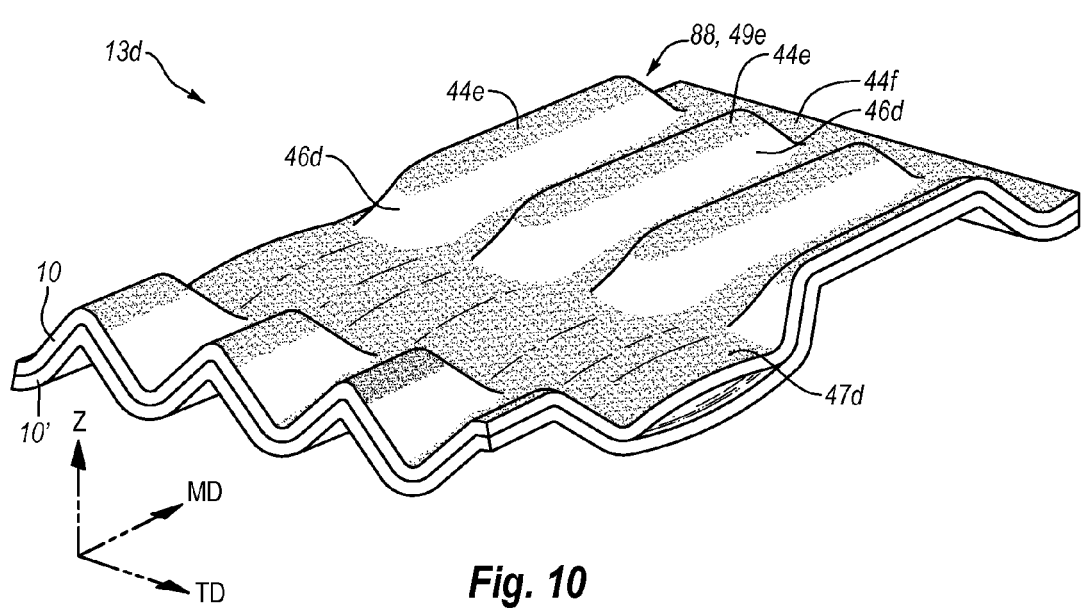
FIG. 10 illustrates a view of a multi-layered thermoplastic film with visually-distinct regions created by passing thermoplastic films through the intermeshing rollers of FIG. 9.

Referring now to FIG. 10, a multi-layer film 13d with bonded regions dispersed about un-bonded regions created using the SELF'ing intermeshing rollers 72, 74 is shown. In particular, as the films 10, 10' pass through the SELF'ing intermeshing rollers 72, 74, the teeth 86 can press a portion of the multi-layer web or film out of plane to cause permanent deformation of a portion of the film in the Z-direction. The portions of the film that pass between the notched regions 84 of the teeth 86 will be substantially unformed in the Z-direction, resulting in a plurality of deformed, raised, rib-like elements 88. The length and width of rib-like elements 88 depends on the length and width of teeth 86.

As shown by FIG. 10, the strainable network of the multi-layer film 13d can include first thicker regions 44e, second thicker regions 44f, stretched, thinner transitional regions 46d connecting the first and second thicker regions 44e, 44f. The first thicker regions 44e and the stretched, thinner regions 46d can form the raised rib-like elements 88 of the strainable network. In one or more embodiments, the rib-like elements 88 can comprise bonded regions 49e can be discontinuous or separated as they extend across the multi-layered film 15e in both transverse and machine directions. This is in contrast to stripes that extend continuously across a film in one of the machine or transverse directions.

The rib-like elements 88 can allow the multi-layered lightly-laminated film 15e to undergo a substantially "geometric deformation" prior to a "molecular-level deformation." As used herein, the term "molecular-level deformation" refers to deformation, which occurs on a molecular level and is not discernible to the normal naked eye. That is, even though one may be able to discern the effect of molecular-level deformation, e.g., elongation or tearing of the film, one is not able to discern the deformation, which allows or causes it to happen. This is in contrast to the term "geometric deformation," which refers to deformations of multi-layered lightly-laminated film 15e which are generally discernible to the normal naked eye when the multi-layered film 15e or articles embodying the multi-layer film 13d are subjected to an applied strain. Types of geometric deformation include, but are not limited to bending, unfolding, and rotating.

Thus, upon application of strain, the rib-like elements 88 can undergo geometric deformation before either the rib-like elements 88 or the flat regions undergo molecular-level deformation. For example, an applied strain can pull the rib-like elements 88 back into plane with the flat regions prior to any molecular-level deformation of the multi-layer film 13*d*. Geometric deformation can result in significantly less resistive forces to an applied strain than that exhibited by molecular-level deformation.

In addition to improved properties thus provided by the ability to geometrically deform, the SELF'ing process also discontinuously and lightly laminates adjacent layers of the multi-layer film together, providing the benefits noted above. In particularly, the film layers 10, 10' can be lightly laminated at regions 49*e*, but un-bonded at regions 47*d*. The strength of the lamination bond is relatively weak, so as to be less than the weakest tear resistance of the individual layers of the multi-layer film. Thus, the lamination bond is broken rather than the individual layer tearing upon application of a force. Typically, tearing in the MD direction requires less applied force than tearing in the TD direction, thus in one embodiment, the lamination bond strength is less than the MD tear resistance of each individual layer of the multi-layer film.

Figure 11:
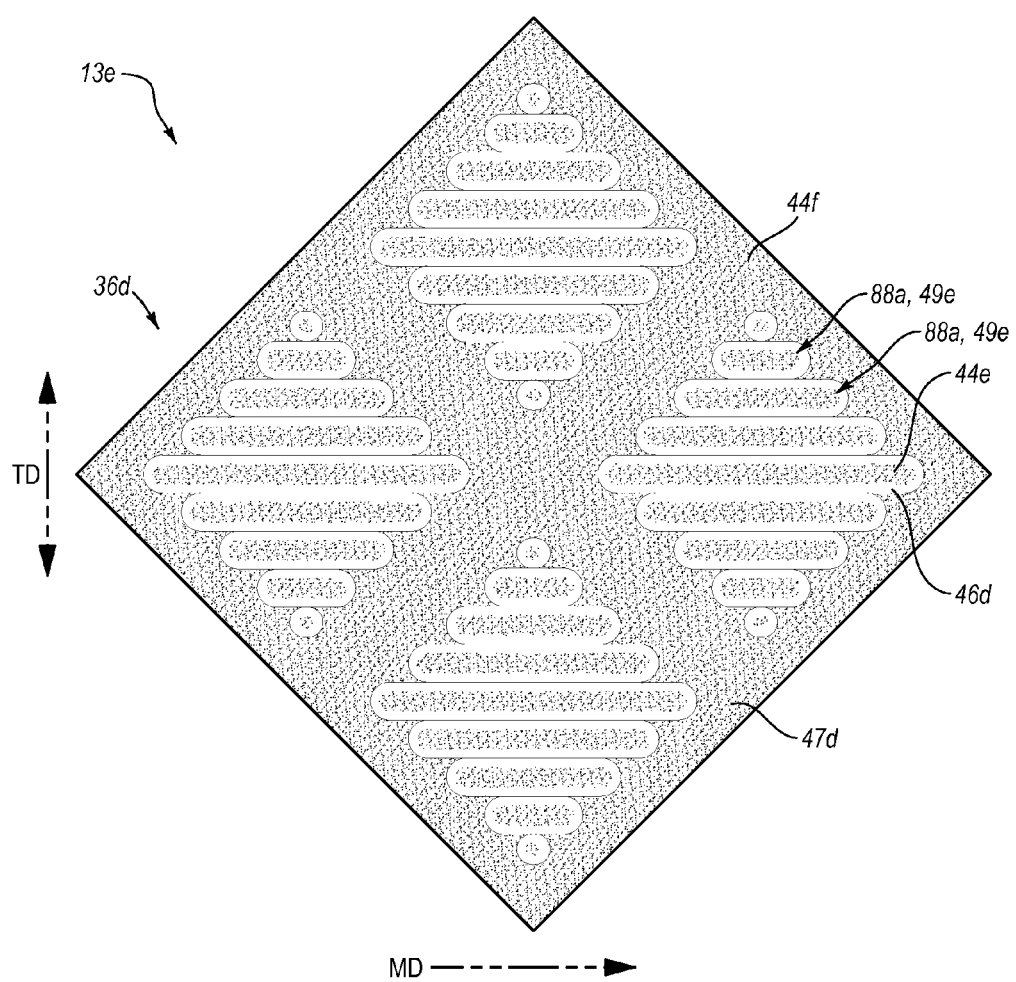
FIG. 11 illustrates a view of another multi-layered thermoplastic film with visually-distinct regions including strainable networks in accordance with one or more implementations of the present invention.

FIG. 11 illustrates a multi-layer film 13*e* with a strainable network of rib-like elements 88*a* arranged in diamond patterns. The strainable network of the multi-layer film 13*e* can include first thicker regions 44*e*, second thicker regions 44*f*, stretched, thinner transitional regions 46*d* connecting the first and second thicker regions 44*e*, 44*f*. The first thicker regions 44*e* and the stretched, thinner regions 46*d* can form the raised rib-like elements 88*a* of the strainable network. In one or more embodiments, the rib-like elements 88*a* can comprise bonded regions 49*e*. Furthermore, the bonded regions 49*e* can be visually-distinct from the non-bonded regions 47*d* as describe above in relation to the bonded regions 49-49*c* and non-bonded regions 47-47*b*.

One or more implementations of the present invention can include strainable network patterns other than those shown by FIGS. 10 and 11, or combinations of various patterns. It should be understood that the term "pattern" is intended to include continuous or discontinuous sections of patterns, such as may result, for example, from the intersection of first and second patterns with each other. Furthermore, the patterns can be aligned in columns and rows aligned in the machine direction, the transverse direction, or neither the machine nor transverse directions.

One will appreciate in light of the disclosure herein that using ring rolling and/or SELFing to form the light bonds can provide the additional benefit of stretching the film layers, thereby reducing the basis weight of the multi-layered lightly-laminated film. Thus, using incremental stretching to form the light bonds can allow for multi-layer films at a lower basis weight (amount of raw material) to perform the same as or better than higher basis weight mono-layer or co-extruded films.

Additionally or alternatively to ring rolling and SELFing, one or more implementations include using embossing, stamping, adhesive lamination, ultrasonic bonding, or other methods of laminating layers of a multilayer film or creating visually-distinct areas by bringing an outer layer 10 into direct contact with an inner layer 10'. In such implementations, one or more of the layers of the multi-layer film can be stretched to reduce the basis weight and/or modify the strength parameters of the film prior to lamination. Stretching of the individual layers can include incrementally-stretching (e.g., ring rolling, SELFing) or continuous stretching (e.g., MDO).

FIGS. 12A-12C illustrate an embossing type roll configuration for lightly bonding and/or forming visually-discrete areas by passing two films through a set of intermeshing rollers including a punch roll 71 and a cooperating die roll 73, where the punch roll is provided with punch regions 77 and the die roll is provided with corresponding die regions 75 for cooperating with the punch regions 77. The punch regions 77 may each have a plurality of punch elements 81 for cooperating with corresponding die elements 79 in the die regions 75. Cooperating engagement of the punch elements 81 with the die elements 79, with a sheet material therebetween, forms a bonded pattern on the material. Alternatively, the cooperating die roll 73 may comprise a conformable surface for conforming to the punch elements 81, or other surface configuration of the punch roll 71.

Referring to FIG. 12C, a pattern formed by the rolls 71, 73 is illustrated in which each of the bonded areas 49*f* of the laminate is formed by a cooperating set of punch and die elements 79, 81, and the remaining unformed areas define the un-bonded areas 47*e* of the multi-layer film with the unexpected appearance.

One will appreciate in light of the disclosure herein that using ring rolling and/or SELFing to form the light bonds can provide the additional benefit of stretching the film layers, thereby reducing the basis weight of the multi-layered lightly-laminated film. Thus, using incremental stretching to form the light bonds can allow for multi-layer films at a lower basis weight (amount of raw material) to perform the same as or better than higher basis weight mono-layer or co-extruded films.

As discussed in detail above, implementations of the present invention involve forming multi-layered films with unexpected appearances and then forming visually-distinct areas in such films by bringing the individual film layers into intimate contact. The following examples describe various exemplary multi-layered films with unexpected appearances.

EXAMPLES

Example A—Control

A continuously laminated two ply film was created by overlaying a 0.5 mil, 0.920 density LLDPE, un-stretched, black film containing 4.8% carbon black with a 0.5 mil, 0.920 density LLDPE, un-stretched, un-pigmented film with 2.5 mil tall ribs spaced approximately 400 mils apart (formed by extruding the film in a ribbed pattern) and continuously laminating the films together by coextrusion. The laminated film A had a black appearance as shown in Table I.

Example B

A discontinuously laminated two ply film was created by overlaying a 0.5 mil, 0.920 density LLDPE, un-stretched, black film containing 4.8% carbon black with a 0.5 mil, 0.920 density LLDPE, un-stretched, un-pigmented film and laminating the films together discontinuous adhesive lamination. The laminated film B had a slightly silver metallic appearance as shown in Table I.

Example C

A discontinuously laminated two ply film was created by overlaying a 0.5 mil, 0.920 density LLDPE, un-stretched, black film containing 4.8% carbon black with a 0.5 mil, 0.920 density LLDPE, un-stretched, un-pigmented film and laminating the films together by MD ring rolling at 430 DOE with a 400 pitch tool. The laminated film C had a more silver metallic appearance as shown in Table I.

Example D

A discontinuously laminated two ply film was created by overlaying a 0.5 mil, 0.920 density LLDPE, un-stretched, black film containing 4.8% carbon black with a 0.5 mil, 0.920 density LLDPE, un-stretched, un-pigmented film with 2.5 mil tall ribs spaced approximately 0.40 inches apart (formed by extruding the film in a stretched ribbed pattern) and laminating the films together by MD ring rolling at 430 DOE with a 400 pitch tool. The laminated film D had a more silver metallic appearance and shown in Table I.

Example E

A discontinuously laminated two ply film was created by overlaying a 0.5 mil, 0.920 density LLDPE, un-stretched, black film containing 4.8% carbon black with a 0.5 mil, 0.920 density LLDPE, un-stretched, un-pigmented film with 2.5 mil tall ribs spaced approximately 0.40 inches apart (formed by extruding the film in a ribbed pattern) and laminating the films together by TD ring rolling at 20 DOE with a 40 pitch tool. The laminated film E had a more silver metallic appearance and shown in Table I.

Example F

A discontinuously laminated two ply film was created by overlaying a 0.5 mil, 0.920 density LLDPE, un-stretched, black film containing 4.8% carbon black with a 0.5 mil, 0.920 density LLDPE, un-stretched, un-pigmented film with 2.5 mil tall ribs spaced approximately 0.40 inches apart (formed by extruding the film in a ribbed pattern), the un-pigmented film then stretched by MD ring rolling at 430 DOE with a 400 pitch tool and laminating the films together by TD ring rolling at 20 DOE with a 40 pitch tool. The laminated film F had a silvery appearance and shown in Table I.

Example G

A discontinuously laminated two ply film was created by overlaying a 0.5 mil, 0.920 density LLDPE, un-stretched, black film containing 4.8% carbon black with a 0.5 mil, 0.920 density LLDPE, un-stretched, un-pigmented film with 2.5 mil tall ribs spaced approximately 0.40 inches apart (formed by extruding the film in a ribbed pattern), the un-pigmented film then stretched by MD ring rolling at 430 DOE with a 400 pitch tool and laminating the films together the discontinuous application of adhesive. The laminated film F had a silvery appearance and shown in Table I.

TABLE I

| Multi-ply Film Un-Pigmented on Pigmented | Description | Appearance Black = 0 Silver Metallic = 4 |
|---|---|---|
| Example A - Control | Pigmented - Unstretched Un-Pigmented - Unstretched Continuous lamination | 0 |
| Example B | Pigmented - Unstretched Un-Pigmented - Unstretched Discontinuous Un-Stretched lamination | 1 |
| Example C | Pigmented - Unstretched Un-Pigmented - Unstretched Discontinuous Stretched lamination | 2 |
| Example D | Pigmented - Unstretched Un-Pigmented - Unstretched, non-Flat Discontinuous Stretched lamination | 3 |
| Example E | Pigmented - Unstretched Un-Pigmented - Unstretched, non-Flat Discontinuous Stretched lamination | 3 |
| Example F | Pigmented - Unstretched Un-Pigmented - Stretched Discontinuous Stretched lamination | 4 |
| Example G | Pigmented - Unstretched Un-Pigmented - Stretched Discontinuous Un-Stretched lamination | 4 |

The Examples in Table I show that a multi-ply film resulting from the discontinuous lamination of an un-pigmented ply to a pigmented ply, where the un-pigmented ply has been cold stretched by prior to or during lamination, will have a noticeably metallic appearance.

One will appreciate in light of the disclosure herein that the multi-layered films with the unexpected appearances and visually-distinct areas can form part of any type of product made from, or incorporating, thermoplastic films. For instance, grocery bags, trash bags, sacks, packaging materials, feminine hygiene products, baby diapers, adult incontinence products, sanitary napkins, bandages, food storage bags, food storage containers, thermal heat wraps, facial masks, wipes, hard surface cleaners, and many other products can include lightly bonded multi-layer films to one extent or another. Trash bags and food storage bags may be particularly benefited by the films and methods of the present invention.

Figure 13:
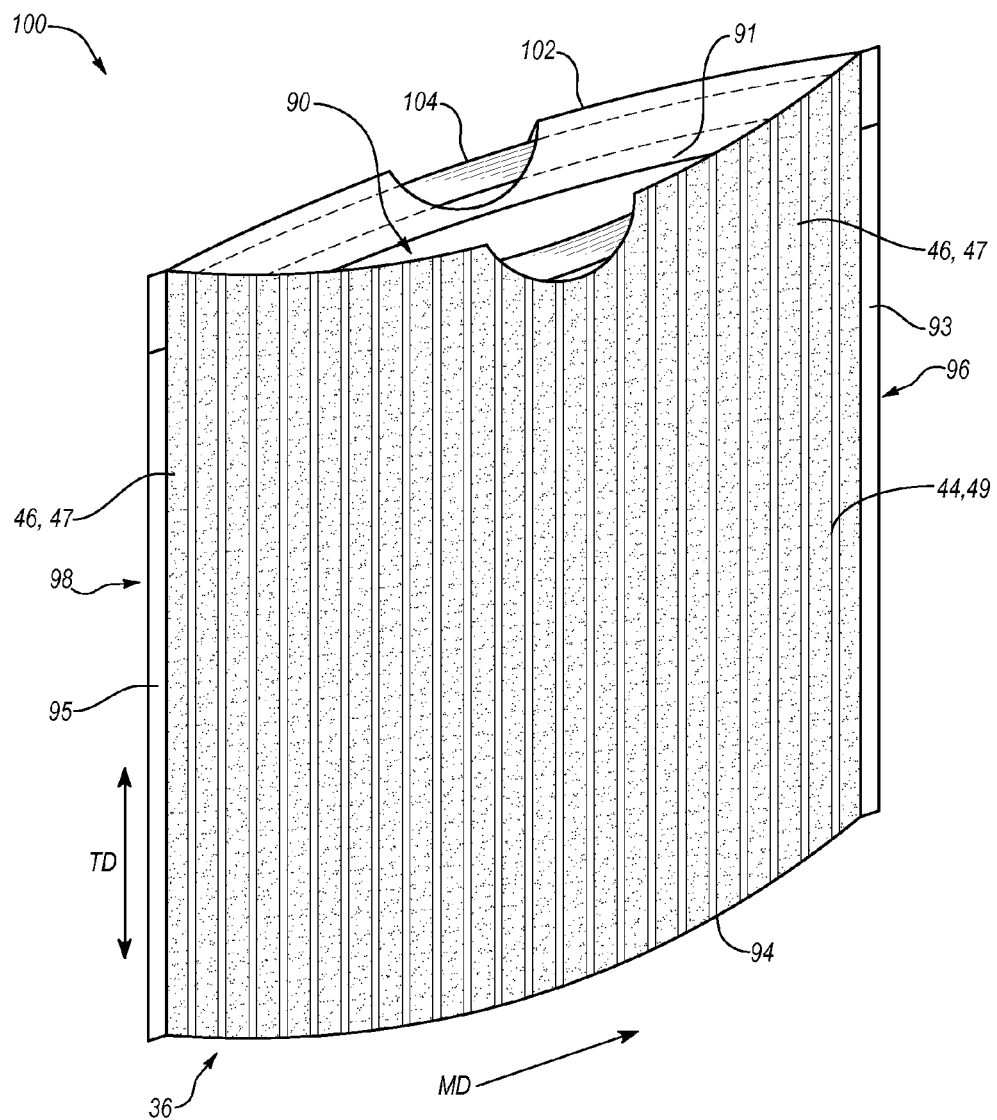
FIG. 13 illustrates a bag incorporating the multi-layered film with visually-distinct regions of FIG. 4 and visually-distinct side seals in accordance with one or more implementations of the present invention.

Referring to FIG. 13, in a particular implementation of the present invention, the multi-layer film 13 with a unique appearance illustrated in FIG. 4 may be incorporated in a bag construction, such as a flexible draw tape bag. The multi-layered bag 100 can include a bag body formed from a piece of incrementally-stretched multi-layered film folded upon itself along a bag bottom 94. Side seals 93 and 95 can bond the sides 96, 98 of the bag body together to form a semi-enclosed container having an opening 90 along an upper edge 102. The bag 100 also optionally includes closure means 104 located adjacent to the upper edge 102 for sealing the top of the bag 100 to form a fully-enclosed container or vessel. The bag 100 is suitable for containing and protecting a wide variety of materials and/or objects. The closure means 104 can comprise flaps, adhesive tapes, a tuck and fold closure, an interlocking closure, a slider closure, a zipper closure or other closure structures known to those skilled in the art for closing a bag. For example, FIG. 13 illustrates a draw tape 104 enclosed within the upper portion of the bag 100 by a hem seal 91.

Furthermore, a bag 100 formed from a multi-layered discontinuously-laminated film can have a first or outer layer of thermoplastic material. The first layer can include first and second side walls joined along a bottom edge, a first side edge, and an opposing second side edge. In particular, the bottom edge of the first layer can comprise a fold. The bag 100 can also include a second or inner layer of thermoplastic material. The second layer can include including first and second side walls joined along a bottom edge, a first side edge, and an opposing second side edge. The second layer is positioned within the first layer. Furthermore, the first and the second layer are lightly bonded to each other and incrementally stretched. The first or outer layer comprises a clear or transparent layer. The inner or second layer comprises a pigmented layer.

As shown, the sides of the bag body can include two film layers with thicker regions 44 that are bonded 49 and stretched regions 46 that are un-bonded. Both the bonded, thicker regions 44, 49 and the stretched, unbounded regions 46, 47 can form of stripes. The stripes can extend across the multi-layered bag 100 in the TD direction, or in other words, from the bottom 94 of the bag 100 toward the top 102. The multi-layered bag 100 can require less material to form than an identical bag formed with film of the same thermoplastic material. Additionally, despite requiring less material, the multi-layered bag 100 includes improved strength properties imparted by lightly bonding adjacent layers of the multi-layer film together. As the bonded regions 49 are areas in which the inner layer is in intimate contact with the outer layer, the bonded regions 49 can be visually-distinct from unbounded areas 47 of the bag 100. In other words, the unbounded areas 46 can have a unique appearance or in other words and appearance that differs from that the inner pigmented layer and the outer substantially un-pigmented layer. As mentioned previously, in one or more embodiments the unique appearance is a metallic appearance. The visually-distinct bonded areas 49 can have the appearance of the inner pigmented layer. For example, when the inner pigmented-layer comprises black, the visually-distinct bonded areas 49 can have a black appearance.

FIG. 13 further illustrates that the side seals 93, 95 can also be visually distinct. In particular, the side seals can have the appearance of the inner pigmented-layer and thus be visually distinct from a main body of the bag 100. As shown by FIG. 13, because the bonded areas 49 may comprise thin stripes the body of the bag 100 may have an appearance substantially that of the unique appearance. For example, in one or more embodiments the main body of the bag 100 can have a metallic appearance. Thus, the side seals 93, 95 can visually stand out compared to the rest of the bag 100. As shown by FIG. 13, in one or more embodiments the side seals can have an increased width compared to conventional side seams and can thus function as an aesthetic feature. For example, in one or more embodiments the side seams 93, 95 can have a width of between 1/16th an inch and one inch. In particular, the side seams 93, 95 can have a width of 1/16th an inch, 1/8th an inch, 1/4th an inch, 1/2 an inch, 3/4th an inch, or 1 inch.

Figure 14:
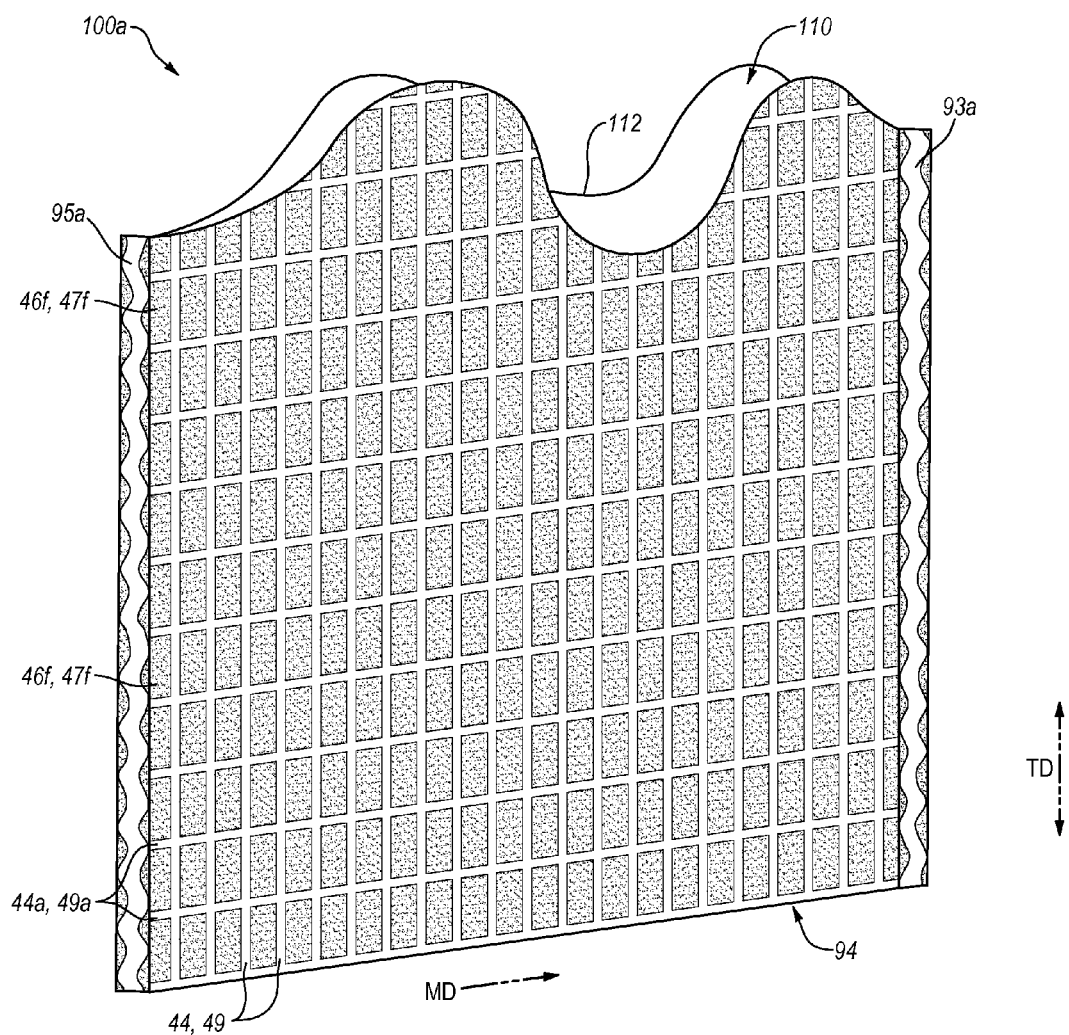
FIG. 14 illustrates a bag incorporating a multi-layered film with visually-distinct regions and decorative visually-distinct side seals in accordance with one or more implementations of the present invention.

FIG. 14 illustrates a multi-layered tie bag 100a incorporating a multi-layered film in accordance with an implementation of the present invention. As shown, the sides of the tie bag 100a can include a pattern of un-bonded, regions 47f and bonded regions 49, 49a created by MD and TD ring rolling. The bonded regions can include stripes that extend across the bag 100a in the machine direction. Additionally, the bonded regions can include stripes that extend across the bag 100a in the transverse direction, or in other words from the bag bottom 94 to flaps 110 of an upper edge 112 of the multi-layered bag 100a. Bonded regions 49, 49a are characterized by relatively light bonding of adjacent layers of the multi-layer film, which acts to absorb forces into breaking of the lamination bond rather than allowing that same force to cause tearing of either of the layers of the multi-layer film. Such action provides significantly increased strength to the multi-layer film as compared to a monolayer similar thickness film or compared to a multi-layer film of similar thickness where the layers are strongly bonded together (i.e., at a bond strength at least as great as the tear resistance of the weakest layer). The lamination bond includes a bond strength that is advantageously less than the tear resistance of each of the individual films so as to cause the lamination bond to fail prior to tearing of the film layers.

In comparison with the film 13b of FIG. 7, the spacing between the MD extending thicker ribs or regions 44a are greater in the multi-layered bag 100a. Using MD ring rolls having a greater pitch between ridges creates this effect. Similarly, the spacing of the TD extending thicker ribs 44 is greater in the multi-layered bag 100a than the multi-layered film 13b. Using TD ring rolls having a greater pitch between ridges creates this effect. Furthermore, the relative spacing between the MD extending stripes and the TD extending stripes differs in the multi-layered bag 100a, while relative spacing is the same in the multi-layered film 13b. This effect is created by using TD ring rolls having a greater pitch between ridges compared to the pitch between ridges of the MD ring rolls. Similar to the bag 100, the bonded regions 49a, 49 can comprise areas of intimate contact between an outer substantially un-pigmented layer and an inner pigmented-layer. Thus, the bonded regions 49a, 49 can be visually-distinct from the unbounded regions 47f of the bag 100a.

FIG. 14 further illustrates that the bag 100a can include visually-distinct side seals 93a, 95a. In particular, FIG. 14 illustrates that the side seals 93a, 95a comprise a serpentine pattern. In alternative embodiments, the side seals can comprise other patterns. In any event, one will appreciate that a manufacturer can create visually-distinct and side seals to provide an aesthetic design to the bag 100a.

Figure 15:
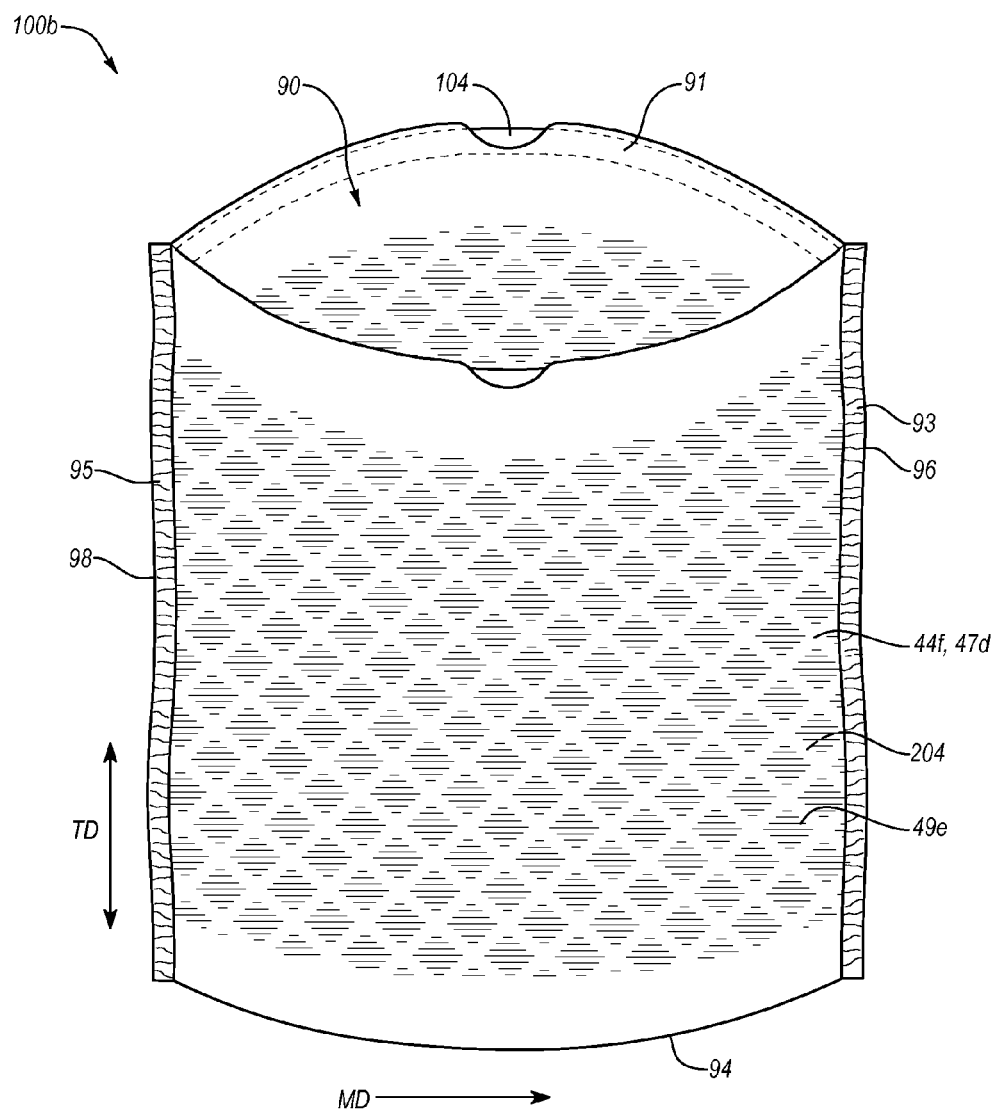
FIG. 15 illustrates another bag having visually-distinct seals in accordance with one or more implementations of the present invention.

In addition to the varying the pattern of visually-distinct regions in a bag or film, one or more implementations also include providing visually-distinct regions in certain sections of a bag or film. For example, FIG. 15 illustrates a multi-layered bag 100b having an upper section adjacent a top hem seal 91 that comprises a region in which the inner pigmented and outer substantially un-pigmented layers are in intimate contact providing the upper area with a visually-distinct appearance. Similarly, the multi-layered bag 100b includes a bottom section adjacent a bottom fold or edge 94 in which the inner pigmented and outer substantially un-pigmented layers are in intimate contact providing the bottom section with a visually-distinct appearance.

A middle section 204 of the multi-layered bag 100b between the upper and lower sections on the other hand can include discontinuous visually-distinct regions. In particular, FIG. 15 illustrates that the middle section can include a strainable network of rib-like elements arranged in diamond patterns similar to the multi-layered film 13e of FIG. 11. Thus, the middle section 204 of the multi-layered bag 100b can include improved properties, such as elasticity and impact resistance, created by the strainable network. Furthermore, the visually-distinct regions (i.e., the stretched transitional regions of the rib-like elements) can serve to notify a consumer of that the middle section includes improved properties.

FIG. 15 further illustrates that the side seals 93, 95 can also be visually distinct. In particular, the side seals can have the appearance of the inner pigmented-layer and thus be visually distinct from a main body of the bag 100b. As shown by FIG. 15, because the bonded areas 49e may comprise two layers in intimate contact and the side seals can comprise four or more layers, the side seals 93, 95 can have an appearance that differs from the bonded areas 49e and the upper and lower areas. For example, the side seals 93, 95 can comprise a darker shades of the color of the pigmented inner-layer.

Figure 16:
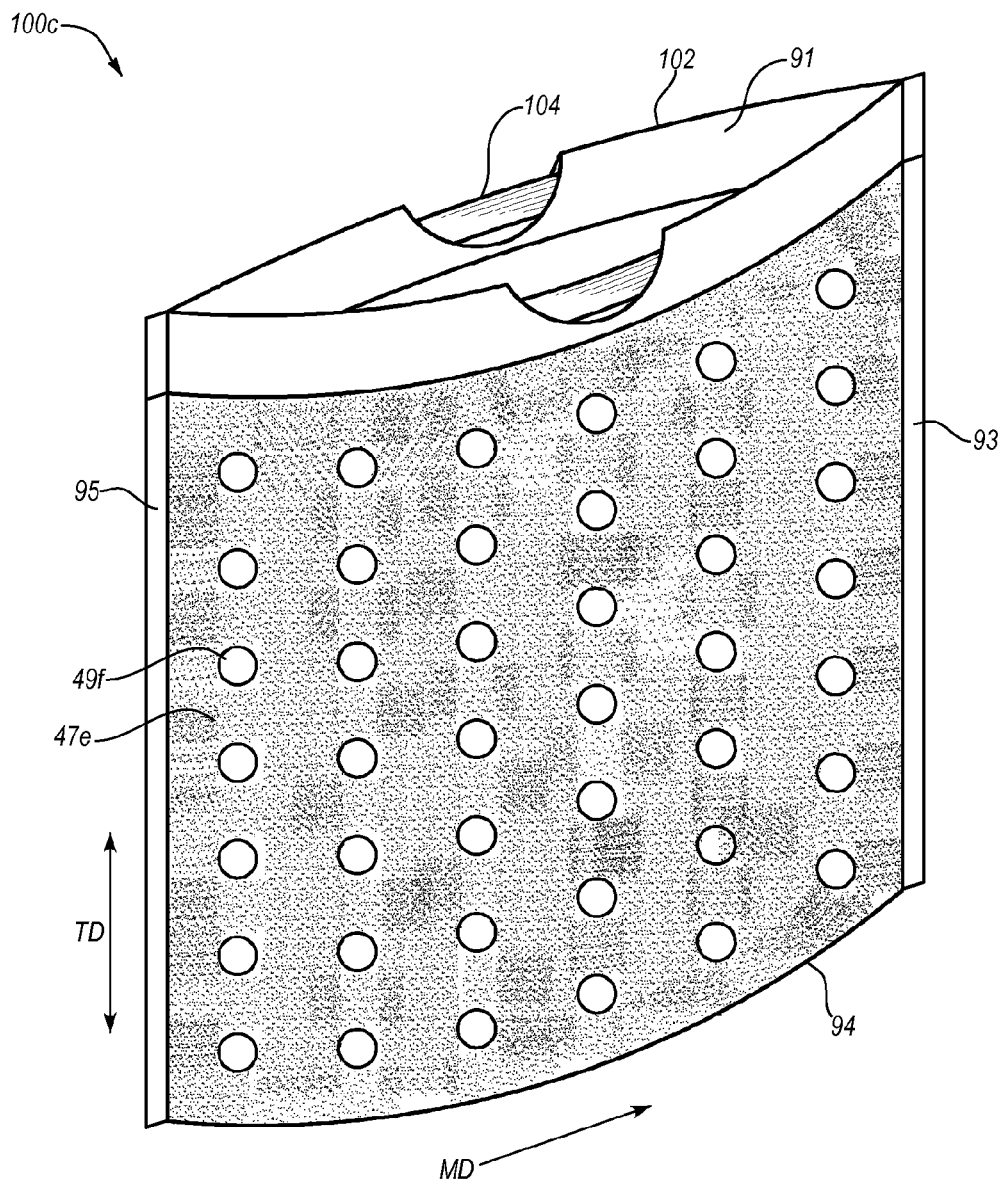
FIG. 16 illustrates a bag incorporating sections of different patterns of visually-distinct regions and visually-distinct seals in accordance with one or more implementations of the present invention.

One will appreciate in light of the disclosure herein that a manufacturer can include decorative visually-distinct regions in the side seals or other regions of a bag by brining the inner pigmented and the outer substantially un-pigmented layers into intimate contact. For example, FIG. 16 illustrates a draw string bag 100c including a plurality of visually-distinct bonded areas 49f interspersed among unbounded areas 47e.

Thus, one will appreciate in light of the disclosure herein that a manufacturer can tailor specific sections or zones of a bag or film with desirable properties by MD, TD, DD ring rolling, SELF'ing, or combinations thereof. One will appreciate in light of the disclosure herein that one or more implementations can include visually-distinct regions arranged in other patterns/shapes. Such additional patterns include, but are not limited to, intermeshing circles, squares, diamonds, hexagons, or other polygons and shapes. Additionally, one or more implementations can include visually-distinct regions arranged in patterns that are combinations of the illustrated and described patterns/shapes.

One or more implementations of the present invention can also include methods of forming multi-layered films and bags having a unique appearance and visually-distinct regions. FIGS. 17-22 and the accompanying description describe such methods. Of course, as a preliminary matter, one of ordinary skill in the art will recognize that the methods explained in detail herein can be modified. For example, various acts of the method described can be omitted or expanded, additional acts can be included, and the order of the various acts of the method described can be altered as desired.

Figure 17:
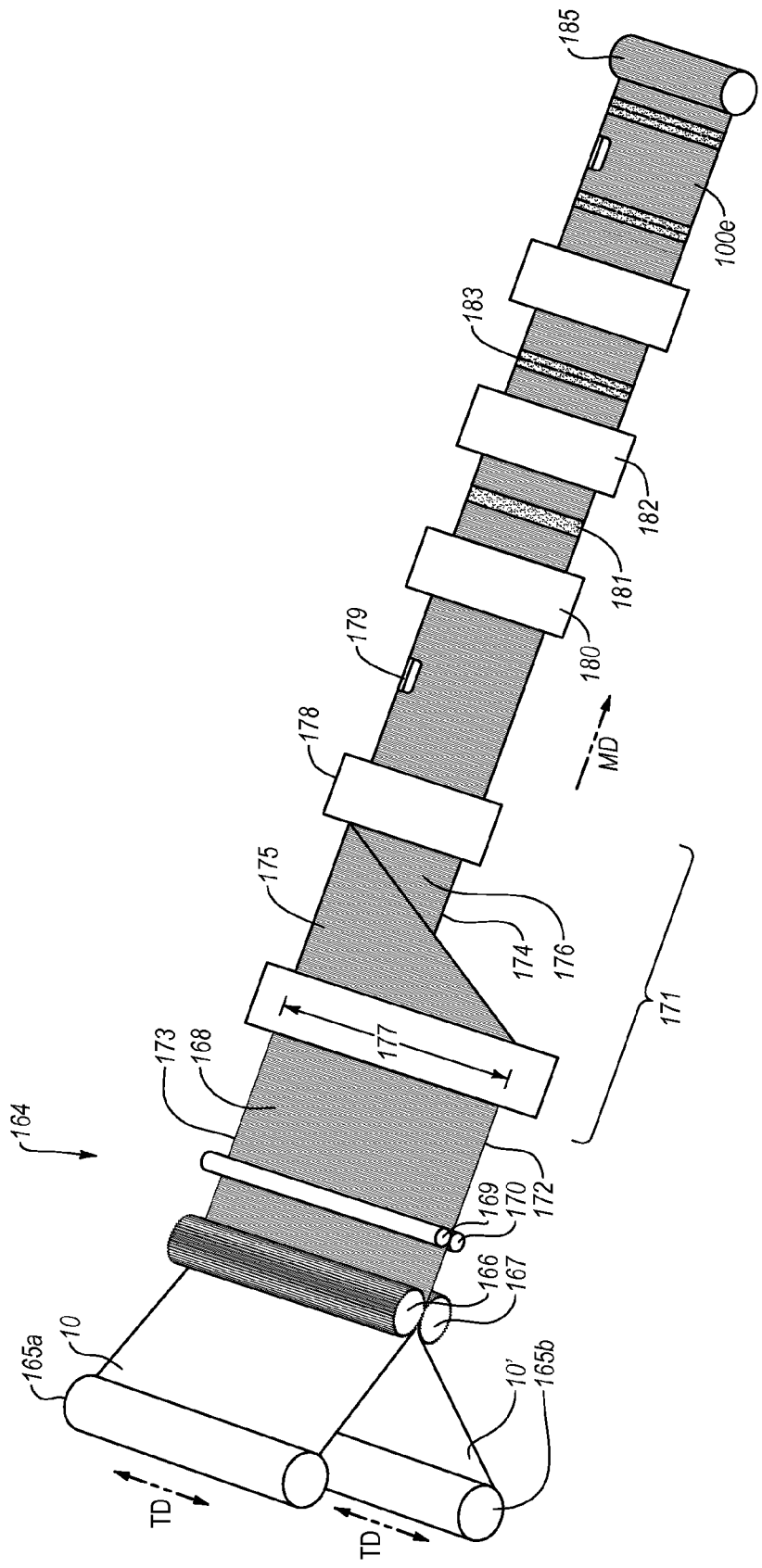
FIG. 17 illustrates a schematic diagram of a bag manufacturing process in accordance with one or more implementations of the present invention.

FIG. 17 illustrates an exemplary embodiment of a high-speed manufacturing process 164 for creating multi-layered thermoplastic film(s) with the unexpected appearance and then producing multi-layered plastic bags therefrom with visually-distinct areas. According to the process 164, a first thermoplastic film layer 10 and a second thermoplastic film layer 10' are unwound from roll 165a and 165b, respectively, and directed along a machine direction. Alternatively, the film layers 10, 10' can be directly from one or more extrusion towers rather than stock rolls 165a, 165b. The first layer 10 can comprise a substantially un-pigmented layer and the second layer 10' can comprise a pigmented layer as described above.

The film layers 10, 10' may pass between first and second cylindrical intermeshing rollers 166, 167 to incrementally stretch and lightly laminate the initially separate film layers 10, 10' to create un-bonded regions and bonded regions in at least one section of a multi-layered lightly-laminated film 168. The intermeshing rollers 166, 167 shown in FIG. 19 have a construction similar to that of intermeshing rollers 12, 14 of FIGS. 3A-3B. In other embodiments, the intermeshing rollers 166, 167 can have the configuration of any of the other intermeshing rollers shown or described herein. The rollers 166, 167 may be arranged so that their longitudinal axes are perpendicular to the machine direction. Additionally, the rollers 166, 167 may rotate about their longitudinal axes in opposite rotational directions as described in conjunction with FIG. 3A. In various embodiments, motors may be provided that power rotation of the rollers 166, 167 in a controlled manner. As the film layers 10, 10' pass between the first and second rollers 166, 167 the ridges and/or teeth of the intermeshing rollers 166, 167 can form a multi-layered film 168 with the unexpected appearance. The first and second rollers 166, 167 can also form visually distinct areas by bringing the layers 10, 10' together into intimate contact. Depending upon the configuration of the intermeshing rollers 166, 167, such visually distinct areas can be readily visible or difficult to see.

During the manufacturing process 164, the multi-layered film 168 can also pass through a pair of pinch rollers 169, 170. The pinch rollers 169, 170 can be appropriately arranged to grasp the multi-layer film 168 with the unexpected appearance.

A folding operation 171 can fold the multi-layer film 168 with the unexpected appearance to produce the sidewalls of the finished bag. The folding operation 171 can fold the multi-layer film 168 with the unexpected appearance in half along the transverse direction. In particular, the folding operation 171 can move a first edge 172 adjacent to the second edge 173, thereby creating a folded edge 174. The folding operation 171 thereby provides a first film half 175 and an adjacent second web half 176. The overall width 177 of the second film half 176 can be half the width 177 of the pre-folded multi-layer film 168 with the unexpected appearance.

To produce the finished bag, the processing equipment may further process the folded multi-layer film 168 with the unexpected appearance. In particular, a draw tape operation 178 can insert a draw tape 179 into ends 172, 173 of the multi-layer film 168 with the unexpected appearance. Furthermore, a sealing operation 180 can form the parallel side edges of the finished bag by forming visually-distinct heat seals 181 between adjacent portions of the folded multi-layer film 168 with the unexpected appearance by bringing the first substantially un-pigmented layer 10 into intimate contact with the second pigmented layer 10'. The heat seal 181 may strongly bond adjacent layers together in the location of the heat seal 181 so as to tightly seal the edges of the finished bag. The heat seals 181 may be spaced apart along the folded multi-layer film 168 with the unexpected appearance to provide the desired width to the finished bags. The sealing operation 180 can form the heat seals 181 using a heating device, such as, a heated knife.

A perforating operation 182 may form a perforation 183 in the heat seals 181 using a perforating device, such as, a perforating knife. The perforations 183 in conjunction with the folded outer edge 174 can define individual bags 100e that may be separated from the multi-layer film 168 with the unexpected appearance. A roll 185 can wind the multi-layer film 168 with the unexpected appearance embodying the finished bags 184 for packaging and distribution. For example, the roll 185 may be placed into a box or bag for sale to a customer.

In still further implementations, the folded multi-layer film 168 with the unexpected appearance may be cut into individual bags along the heat seals 181 by a cutting operation. In another implementation, the folded multi-layer film 168 with the unexpected appearance may be folded one or more times prior to the cutting operation. In yet another implementation, the side sealing operation 180 may be combined with the cutting and/or perforation operations 182.

The sealing operation 180 shown in FIG. 17 can be part of a continuous (FIGS. 18A and 18B) or reciprocating (FIG. 19) bag-making process. As shown in FIG. 18A, a continuous sealing process 180 typically has an input section 204, a rotary drum 206, and an output section 208. The film plies 202 continuously travel from the input section 204 to the rotary drum 206 and then to the output section 208.

The input section generally consists of a driven dancer assembly 210 to control film tension. The rotary drum 206 contains a plurality of heated seal bars 212 which can press against a sealing blanket 214 to make seals 230 on the film plies 202. The heated seal bars 212 can only heat the film plies 202 from one side.

End to end bags are formed with one seal 230 from the drum 206 and side-to-side bags are formed with a pair of seals 230. The drum 206 diameter may be adjusted and/or less than all of the seal bars 212 turned on to determine the distance between seals 230, and hence, bag size. The output section 208 generally includes assemblies that act on the film plies 202 downstream of the seals 230 being formed, such as perforators, winders, folders and the like. The continuous bag making process 180 has the advantage of operating at very high speeds (600 ft./min=300 bags/min).

The continuous bag making process 180 can additionally be used to make both the side seals 93, 95 and the tape or hem seals 91 described above. Because the tape seals hem seals 91 can involve more plies of material or different materials compared with the side seals 93, 95, the seal bars 212 can be divided into two individual seal bars. In particular, the seal bars can include a long seal side seal bar 220 and a shorter tape seal bar 222, as shown in FIG. 18B. Because the bag may have different plies of material in the side seals 93, 95 and the tape seals 91, the side seal bar 220 may have different heating properties from the tape seal bar 222. For example, the tape seal bar 220 may be heated to a higher temperature to penetrate the additional plies in the tape seals 91. Furthermore as shown by FIG. 18C, in one or more embodiments the seal bars can comprise a decorative design. In particular, FIG. 18C illustrates a serpentine seal bar 212a used to create the heat seals 93a, 95a described above in relation to FIG. 14.

Additionally, the heat seal bars 212, 212a can have a width equal to or greater than about 1/16th. In particular, in one or more embodiments the heat seal bars 212, 212a can have a width of between about 1/16th of an inch and about 1 inch. More particularly, the heat seal bars 212, 212a can have a width of 1/8th an inch, 1/4th an inch, 1/2 an inch, 3/4 an inch, etc. The heat seal bars 212, 212a can form heat seals 93, 95 having a corresponding width. The increased widths of the heat seal bars 212, 212a can allow for the formation of visually noticeable side seals 93, 95.

Figure 19:
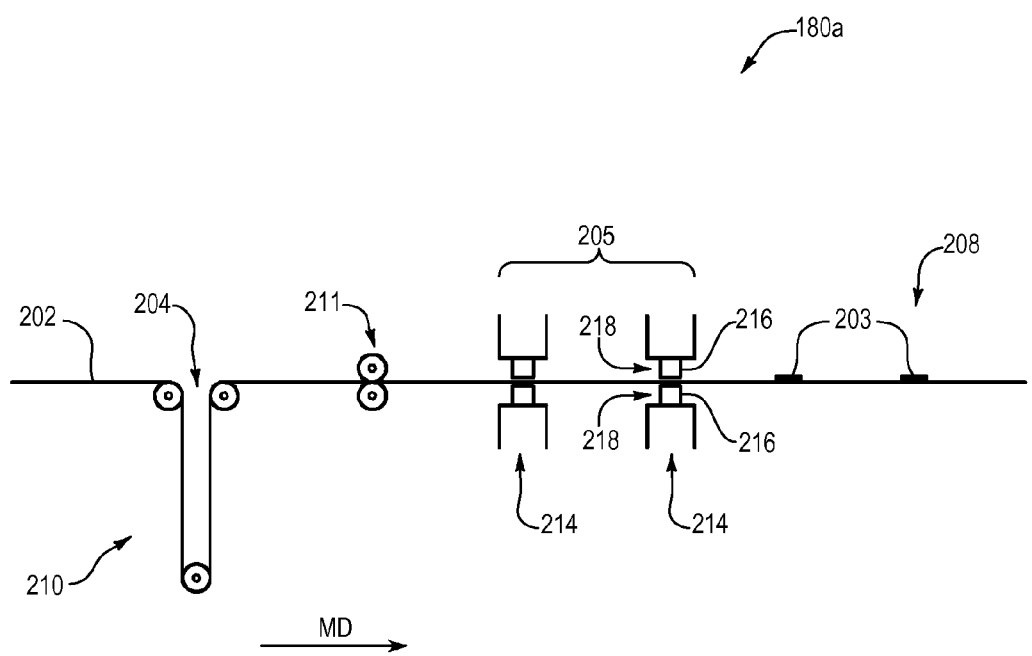
FIG. 19 illustrates another sealing process in accordance with one or more implementations of the present invention.

As shown in FIG. 19, a reciprocating sealing process 180a typically has an input section 204, a linear sealing section 205, and an output section 208. The input section 204 generally includes of a dancer assembly 210, and a driven nip 211. The film plies 202 are unwound continuously from a roll or during a continuous process and pass through the dancer assembly 210 to the driven nip 211. The driven nip 211 rotates intermittently, with one cycle of rotation reflecting the width of one bag. The nip 211 can stop for sealing and the time the nip 211 is motionless is adjustable as required for downstream operations (such as sealing).

The dancer assembly 210, prior to the intermittently operating nip 211 and after the continuously operating unwind or process, can gather the film plies 202 during the time the nip 211 is not rotating. This can provide enough film plies 202 to satisfy the requirements of the nip 211 when it begins rotating again. Hence, in the input section 204, the film plies 202 can move in a continuous manner, travel through a dancer assembly 210 that gathers the film plies 202, and through a nip 211 that operates in an intermittent manner, converting the film plies 202 motion from a continuous motion to an intermittent motion, one bag width at a time.

The linear sealing section 205 of a reciprocating bag making process 180a can include of one or more sealing stations 214 with heated seal bars 316 spaced one bag width apart. The heated seal bars 316 can contact the film plies 202 each time the film plies 202 motion stops as the film plies 202 travel in a straight path through the machine. During the film plies 202 stoppage time, each seal bar 216 (similar to seal bars 212, 212a) on a sealing station 214 can move from a stationary position 218 above or below the web to a position which places the seal bar 216 in contact with the film plies 202 from both sides. The seal bar 216 can then contact the film plies 202 for a period of time as required to make a seal 203. The seal bar 216 can then retract to its original stationary position 218, after which the film plies 202 advance intermittently a multiple of one or more bag widths and the process is repeated. One or more 203. The reciprocating process 180a has the advantage of long residence times, heating the film plies from both sides and high quality seals 203, but can be limited in rate (typically 120 bags/min).

Figure 20:
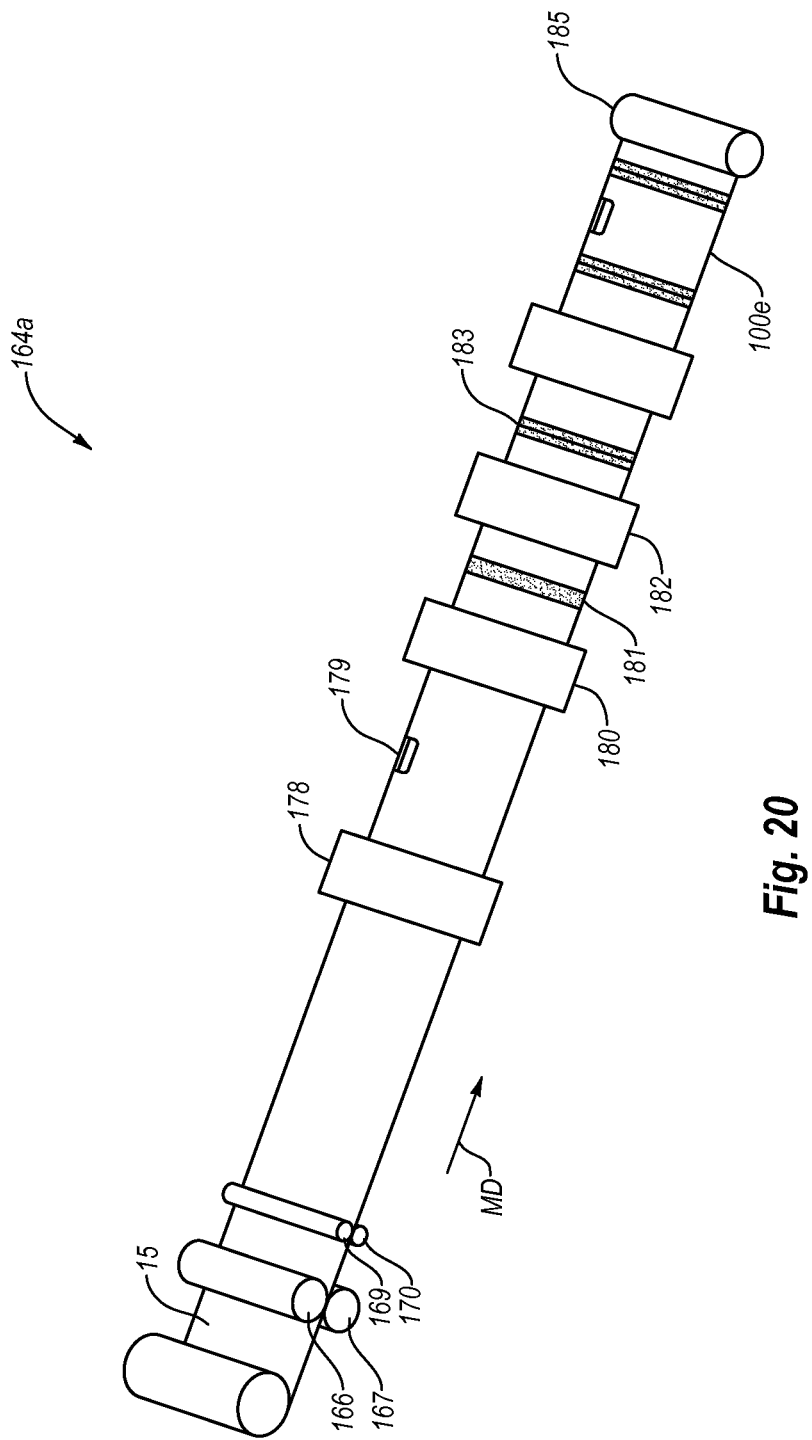
FIG. 20 illustrates a schematic diagram of another bag manufacturing process in accordance with one or more implementations of the present invention.

FIG. 20 illustrates another manufacturing process 164a for producing a multi-layered bag with an unexpected appearance and visually distinct areas. The process 164a can be similar to process 164 of FIG. 17, except that the film layers 10, 10' are folded in half to form c-, u-, or j-folded films 15. Thus, in such implementations, the films 10, 10' are unwound from the roll are already folded and inserted together. Methods of forming c-, u-, or j-folded films are described in International Patent Application No. PCT/US14/24431 filed Mar. 12, 2014 and entitled STOCK ROLLS CONTAINING A FIRST FOLDED FILM WITHIN A SECOND FOLDED FILM AND METHODS OF MAKING THE SAME and U.S. Patent Application Publication No. 2013/0115396. Each of the above-referenced patents and applications are hereby incorporated by reference in its entirety.

The folded film layers 15 may pass between first and second cylindrical intermeshing rollers 166, 167 to incrementally stretch and lightly laminate the separate film layers 10, 10' to create un-bonded regions and bonded regions in at least one section of a multi-layered lightly-laminated film. As the film layers 10, 10' pass between the first and second rollers 166, 167 the ridges and/or teeth of the intermeshing rollers 166, 167 can form a multi-layered film with the unexpected appearance. The first and second rollers 166, 167 can also form visually distinct areas by bringing the layers 10, 10' together into intimate contact. Depending upon the configuration of the intermeshing rollers 166, 167, such visually distinct areas can be readily visible or difficult to see.

In any event, the process 164a can continue as described above in relation to FIG. 17 and process 164 to produce finished bag with the unexpected appearance. In particular, a draw tape operation 178 can insert a draw tape 179 into ends 172, 173 of the multi-layer film 168 with the unexpected appearance. Furthermore, a sealing operation 180 can form the parallel side edges of the finished bag by forming visually-distinct heat seals 181 between adjacent portions of the folded multi-layer film 168 with the unexpected appearance by bringing the first substantially un-pigmented layer 10 into intimate contact with the second pigmented layer 10'. The heat seal 181 may strongly bond adjacent layers together in the location of the heat seal 181 so as to tightly seal the edges of the finished bag. The heat seals 181 may be spaced apart along the folded multi-layer film 168 with the unexpected appearance to provide the desired width to the finished bags. The sealing operation 180 can form the heat seals 181 using a heating device, such as, a heated knife. A perforating operation 182 may form a perforation 183 in the heat seals 181 using a perforating device, such as, a perforating knife. The perforations 183 can define individual bags 100e that may be separated from the multi-layer film 168 with the unexpected appearance.

Figure 21:
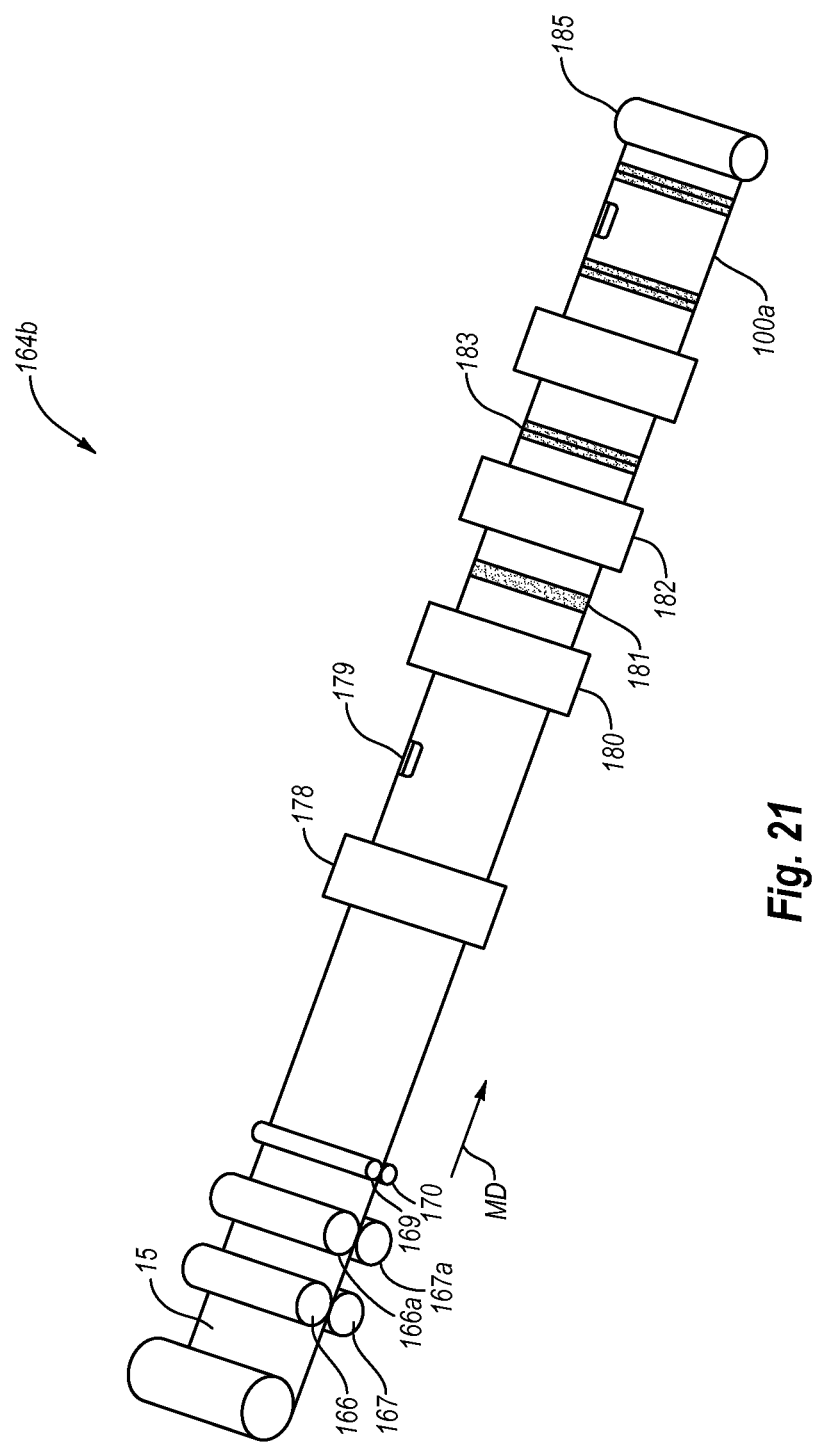
FIG. 21 illustrates a schematic diagram of yet another bag manufacturing process in accordance with one or more implementations of the present invention.

FIG. 21 illustrates yet another manufacturing process 164b for producing a multi-layered bag 100a with an unexpected appearance and visually distinct areas. The process 164a can be similar to process 164a of FIG. 20, except that the fold films 15 can pass through a second set of intermeshing rollers 166a, 167a, respectively, after passing through intermeshing rollers 166, 167. In one or more embodiments, the intermeshing rollers 166a, 167a can comprise SELFing rollers or other rollers described herein. The intermeshing rollers 166a, 167a can further stretch and lightly bond at least a portion of the layers of the fold films 15 together and optionally create visually distinct areas as described above.

Figure 22:
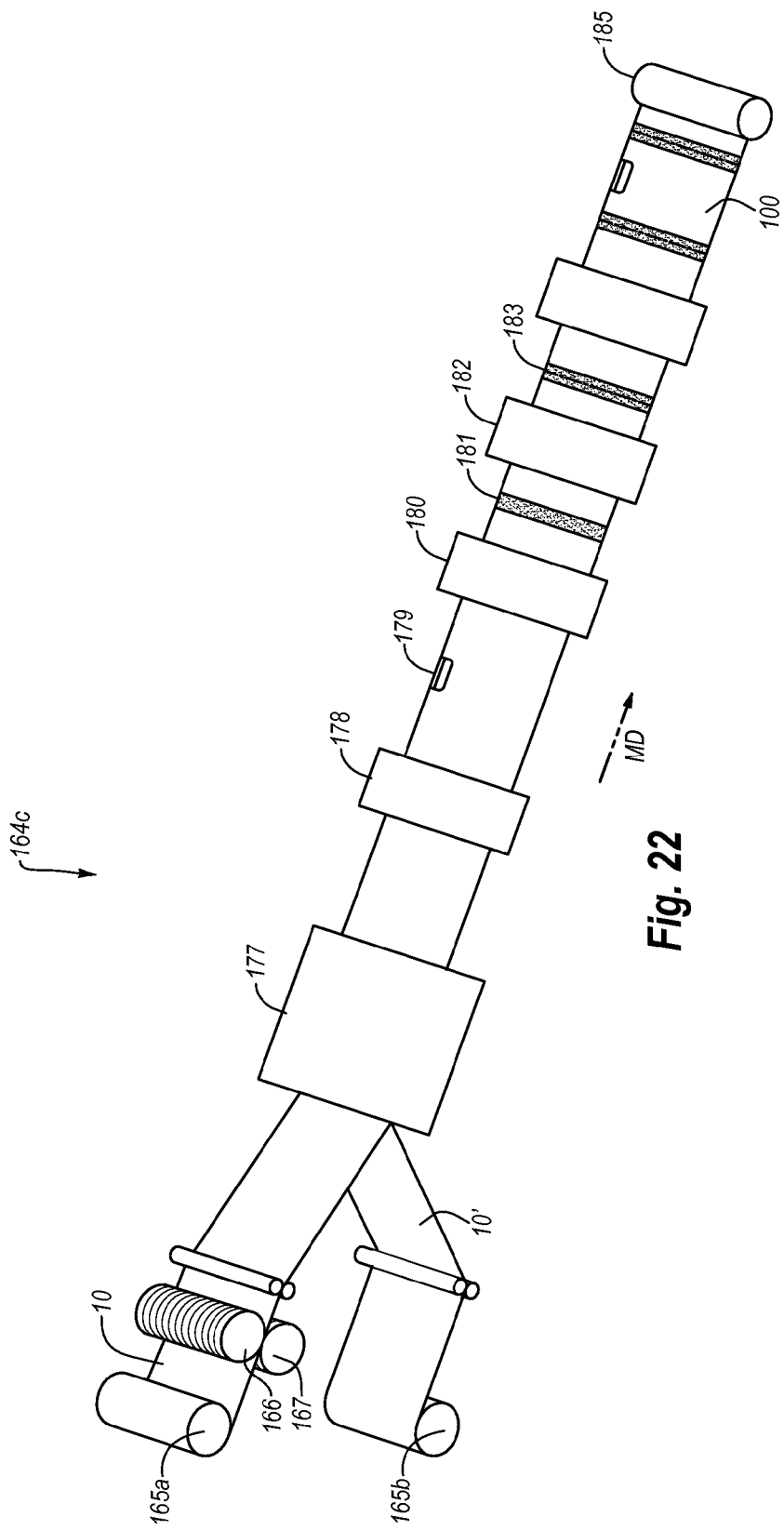
FIG. 22 illustrates a schematic diagram of still another bag manufacturing process in accordance with one or more implementations of the present invention.

FIG. 22 illustrates yet another manufacturing process 164c for producing a multi-layered bag 100 with an unexpected appearance and visually distinct areas such as those describe above in relation to Examples F and G. The process 164c can involve unwinding a substantially un-pigmented first-film 10 from a first stock roll 165a and passing the first film 10 through a pair of intermeshing rollers to incrementally stretch the substantially un-pigmented first-film 10.

The process can further involve laminating the substantially un-pigmented first-film 10 to a second pigmented film 10' unwound from a second stock roll 165b via a laminating process 177. The laminating process 177 can comprise a discontinuous stretched lamination (e.g., a ring rolling process, a selfing process). A discontinuous stretched lamination process can involve incrementally stretching and bonded the two layers 10, 10' together. Alternatively, the laminating process can comprise a discontinuous un-stretched lamination process such as adhesive lamination, pressure bonding (e.g., embossing), ultrasonic bonding, corona lamination, and the like).

Accordingly, FIGS. 1A-22 and the corresponding text, therefore, specifically show, describe, or otherwise provide a number of systems, components, apparatus, and methods for forming an intermittingly bonded and stretched multi-layer film with an unexpected appearance and visually distinct regions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. Moreover, any combination of the above-described elements in all possible variations thereof is encompassed by the invention unless otherwise indicated herein or otherwise clearly contradicted by context. All changes that come within the meaning and range of equivalency of the claims are to be embraced within their scope.

We claim:

1. A multi-layer film, comprising:
   a first substantially un-pigmented thermoplastic film layer comprising a plurality of alternating stretched-thinner webs and thicker ribs, wherein the first substantially un-pigmented thermoplastic film layer is transparent or translucent;
   a second pigmented thermoplastic film layer comprising a pigment, the second pigmented thermoplastic film layer having a first color created by the pigment;
   a plurality of non-continuous bonds securing the first substantially un-pigmented thermoplastic film layer to the second pigmented thermoplastic film layer;
   un-bonded areas in which the first substantially un-pigmented thermoplastic film layer and the second pigmented thermoplastic film layer are un-bonded and in which there are no intervening layers between the first substantially un-pigmented thermoplastic film layer and the second pigmented thermoplastic film layer; and
   wherein, when viewed from the first substantially un-pigmented thermoplastic film layer side:
      the un-bonded areas have a second color differing from the first color, wherein the multi-layer film is devoid of a pigment of the second color; and
      one or more bonded areas have the first color.

2. The multi-layer film as recited in claim 1, wherein the one or more bonded areas comprise areas in which the first substantially un-pigmented thermoplastic film layer and the second pigmented thermoplastic film layer are in direct contact.

3. The multi-layer film as recited in claim 2, wherein the one or more bonded areas comprise areas in which the first substantially un-pigmented thermoplastic film layer and the second pigmented thermoplastic film layer are heat sealed together.

4. The multi-layer film as recited in claim 2, wherein the un-bonded areas having the second color comprise areas in which the first substantially un-pigmented thermoplastic film layer and the second pigmented thermoplastic film layer are separated by a gap.

5. The multi-layer film as recited in claim 4, wherein the first substantially un-pigmented thermoplastic film layer is transparent.

6. The multi-layer film as recited in claim 1, wherein:
   the first color is a non-metallic color; and
   the second color is a metallic color.

7. The multi-layer film as recited in claim 6, wherein:
   the first color is carbon black;
   the second color is a metallic silver; and
   the first substantially un-pigmented thermoplastic film layer is transparent.

8. A multi-layer film, comprising:
   a first substantially un-pigmented thermoplastic film layer, wherein the first substantially un-pigmented thermoplastic film layer is transparent or translucent;
   a second pigmented thermoplastic film layer comprising a pigment, the second pigmented thermoplastic film layer having a first color created by the pigment, wherein the second pigmented layer is directly adjacent to the first substantially un-pigmented thermoplastic film layer;
   a plurality of bonded areas in which the first substantially un-pigmented thermoplastic film layer is in intimate contact with the second pigmented thermoplastic film layer; and
   a plurality of un-bonded areas in which an air gap separates the first substantially un-pigmented thermoplastic film layer from the second pigmented thermoplastic film layer;
   wherein the un-bonded areas, when viewed from the first substantially un-pigmented thermoplastic film layer side of the multi-layer film, have a second color differing from the first color;
   wherein the bonded areas, when viewed from the first substantially un-pigmented thermoplastic film layer side of the multi-layer film, are the first color.

9. The multi-layer film as recited in claim 8, wherein the bonded areas comprise heat seals.

10. The multi-layer film as recited in claim 8, wherein the bonded areas comprise pressure bonds.

11. The multi-layer film as recited in claim 10, wherein the pressure bonds comprise embosses.

12. The multi-layer film as recited in claim 10, wherein the pressure bonds comprise ring rolled bonds.

13. The multi-layer film as recited in claim 8, wherein the bonded areas comprise lamination bonds.

14. The multi-layer film as recited in claim 8, wherein:
the first color is a non-metallic color; and
the second color is a metallic color.

15. The multi-layer film as recited in claim 14, wherein:
the first color is carbon black;
the second color is a metallic silver; and
the first substantially un-pigmented thermoplastic film layer is transparent.

16. A multi-layer film, comprising:
a first substantially un-pigmented thermoplastic film layer, wherein the first substantially un-pigmented thermoplastic film layer is transparent or translucent;
a second pigmented thermoplastic film layer comprising a pigment, the second pigmented thermoplastic film layer having a first color created by the pigment, wherein the second pigmented layer is directly adjacent to the first substantially un-pigmented thermoplastic film layer;
a plurality of non-continuous bonds securing the first substantially un-pigmented thermoplastic film layer in intimate contact to the second pigmented thermoplastic film layer;
a plurality of heat seals securing the first substantially un-pigmented thermoplastic film layer to the second pigmented thermoplastic film layer;
a plurality of un-bonded areas in which the first substantially un-pigmented thermoplastic film layer the second pigmented thermoplastic film layer are not bonded to each other;
wherein the un-bonded areas, when viewed from the first substantially un-pigmented thermoplastic film layer side of the multi-layer film, have a second color differing from the first color;
wherein the heat seals, when viewed from the first substantially un-pigmented thermoplastic film layer side of the multi-layer film, are the first color.

17. The multi-layer film as recited in claim 16, wherein the plurality of non-continuous bonds comprises pressure bonds.

18. The multi-layer film as recited in claim 17, wherein the pressure bonds comprise embosses.

19. The multi-layer film as recited in claim 18, wherein the pressure bonds comprise ring rolled bonds.

20. The multi-layer film as recited in claim 16, wherein the plurality of non-continuous bonds comprises lamination bonds.

21. The multi-layer film as recited in claim 16, wherein:
the first color is carbon black;
the second color is a metallic silver; and
the first substantially un-pigmented thermoplastic film layer is transparent.

\* \* \* \* \*